United States Patent
Jeon et al.

(10) Patent No.: US 10,873,962 B2
(45) Date of Patent: Dec. 22, 2020

(54) MECHANISMS FOR HANDLING UPLINK GRANTS INDICATING DIFFERENT PHYSICAL UPLINK SHARED CHANNEL STARTING POSITIONS IN A SAME SUBFRAME

(71) Applicant: Apple Inc., Cupertino, CA (US)

(72) Inventors: Jeongho Jeon, San Jose, CA (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/480,196

(22) PCT Filed: Mar. 28, 2018

(86) PCT No.: PCT/US2018/024748
§ 371 (c)(1),
(2) Date: Jul. 23, 2019

(87) PCT Pub. No.: WO2018/183436
PCT Pub. Date: Oct. 4, 2018

(65) Prior Publication Data
US 2019/0394792 A1    Dec. 26, 2019

Related U.S. Application Data

(60) Provisional application No. 62/478,448, filed on Mar. 29, 2017.

(51) Int. Cl.
*H04W 72/12* (2009.01)
*H04W 16/14* (2009.01)
(Continued)

(52) U.S. Cl.
CPC ....... *H04W 72/1268* (2013.01); *H04W 16/14* (2013.01); *H04W 72/1215* (2013.01);
(Continued)

(58) Field of Classification Search
CPC ......... H04W 72/1268; H04W 72/1215; H04W 16/14
(Continued)

(56) References Cited

U.S. PATENT DOCUMENTS

2018/0092051 A1*  3/2018  Dinan ............... H04W 72/0406
2020/0245265 A1*  7/2020  Dinan ................. H04W 52/365

OTHER PUBLICATIONS

PCT International Preliminary Report on Patentability in International Appln. No. PCT/US2018/024748, dated Oct. 10, 2019, 9 pages.
(Continued)

*Primary Examiner* — Peter G Solinsky
(74) *Attorney, Agent, or Firm* — Fish & Richardson P.C.

(57) ABSTRACT

Methods, systems, and computer-readable storage media are provided for handling uplink grants indicating different physical uplink shared channel (PUSCH) starting positions in a same subframe of enhanced Licensed Assisted Access (eLAA) systems. In embodiments, a user equipment (UE) may receive Downlink Control Information (DCI). The DCI may indicate at least two uplink grants for one or more LAA secondary cell. Each of the at least two uplink grants may indicate different starting positions for PUSCH transmissions within a same subframe. The UE may align the different starting positions such that the UE is to transmit uplink transmissions according to the at least two uplink grants while the UE is in a transmission mode. Other embodiments may be described and/or claimed.

25 Claims, 10 Drawing Sheets

(51) Int. Cl.
*H04W 72/14* (2009.01)
*H04W 74/08* (2009.01)
*H04W 88/06* (2009.01)

(52) U.S. Cl.
CPC ....... *H04W 72/1289* (2013.01); *H04W 72/14* (2013.01); *H04W 74/0808* (2013.01); *H04W 88/06* (2013.01)

(58) Field of Classification Search
USPC .......................................................... 370/330
See application file for complete search history.

(56) References Cited

OTHER PUBLICATIONS

International Patent Office—International Search Report and Written Opinion dated Jul. 4, 2018, from International Application No. PCT/US2018/024748, 15 pages.

NTT Docomo, Inc., "Remaining details on PUSCH resource allocation and scheduling design for eLAA," 3GPP TSG RAN WG1 Meeting #86, R1-167343, Agenda Item: 7.2.1.1, Aug. 22-26, 2016, Gothenburg, Sweden, 5 pages.

LG Electronics, "Discussion on multiple starting and ending positions for LAA UL," 3GPP TSG RAN WG1 Meeting #88bis, R1-1704838, Agenda Item: 7.2.2.2, Apr. 3-7, 2017, Spokane, USA, 3 pages.

Ericsson, "Multiple starting and ending positions for LAA UL," 3GPP TSG RAN WG1 Meeting #88bis, R1-1705451, Agenda Item: 7.2.2.2, Apr. 3-7, 2017, Spokane, USA, 4 pages.

3GPP, "Technical Specification Group Radio Access Network; Evolved Universal Terrestrial Radio Access (E-UTRA); Multiplexing and channel coding (Release 14)," 3GPP TS 36.212 V14.2.0 (Mar. 2017), Lte Advanced Pro, 197 pages.

3GPP, "Technical Specification Group Radio Access Network; Evolved Universal Terrestrial Radio Access (E-UTRA); Physical layer procedures (Release 14)," 3GPP TS 36.213 V14.2.0 (Mar. 2017), Lte Advanced Pro, 454 pages.

\* cited by examiner

US 10,873,962 B2

MECHANISMS FOR HANDLING UPLINK GRANTS INDICATING DIFFERENT PHYSICAL UPLINK SHARED CHANNEL STARTING POSITIONS IN A SAME SUBFRAME

RELATED APPLICATIONS

The present application is a national phase entry under 35 U.S.C. § 371 of International Application No. PCT/US2018/024748, filed Mar. 28, 2018, entitled "MECHANISMS FOR HANDLING UPLINK GRANTS INDICATING DIFFERENT PHYSICAL UPLINK SHARED CHANNEL STARTING POSITIONS IN A SAME SUBFRAME," which claims priority under 35 U.S.C. § 119 to U.S. Provisional Application No. 62/478,448 filed Mar. 29, 2017, the contents of each of which are hereby incorporated by reference in their entireties.

FIELD

Various embodiments of the present application generally relate to the field of wireless communications, and in particular, to conditional handovers and mobility state estimation.

BACKGROUND

Some Long Term Evolution (LTE) systems may operate in unlicensed spectrum, which are typically in the 5 gigahertz (GHz) frequency band. Licensed Assisted Access (LAA), enhanced LAA (eLAA), and further eLAA (feLAA) are Third Generation Partnership Project (3GPP) standards-based technology mechanisms that require an anchor in licensed spectrum to enable communications in the unlicensed spectrum. LAA, eLAA, and feLAA adhere to the listen-before-talk (LBT) protocol, where LAA adheres requires an LBT mechanism only for downlink (DL) communications, while eLAA and feLAA require LBT mechanisms for both DL and uplink (UL) communications. In addition to various regulatory requirements, such as indoor-only use, maximum in-band output power, in-band power spectral density, and out-of-band and spurious emissions, LTE operation in some unlicensed spectrum also implement dynamic frequency selection (DFS) and transmit power control (TPC) depending on the operating band to avoid interfering with radars.

Furthermore, some LTE systems, such as LTE-Advanced systems, support carrier aggregation (CA), which distinguishes between primary cells (PCells) and secondary cell (SCells). A PCell is a main cell with which a user equipment (UE) communicates and maintains the UE's connection with the network. One or more SCells may be allocated and activated to the UEs supporting CA for bandwidth extension. In LAA, some or all of the SCells may operate in the unlicensed spectrum (referred to as "LAA SCells"), where the LAA SCells are assisted by a licensed PCell via CA. When a UE is configured with more than one LAA SCell, the UE may receive UL grants on the configured LAA SCells indicating different Physical Uplink Shared Channel (PUSCH) starting positions within a same subframe.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
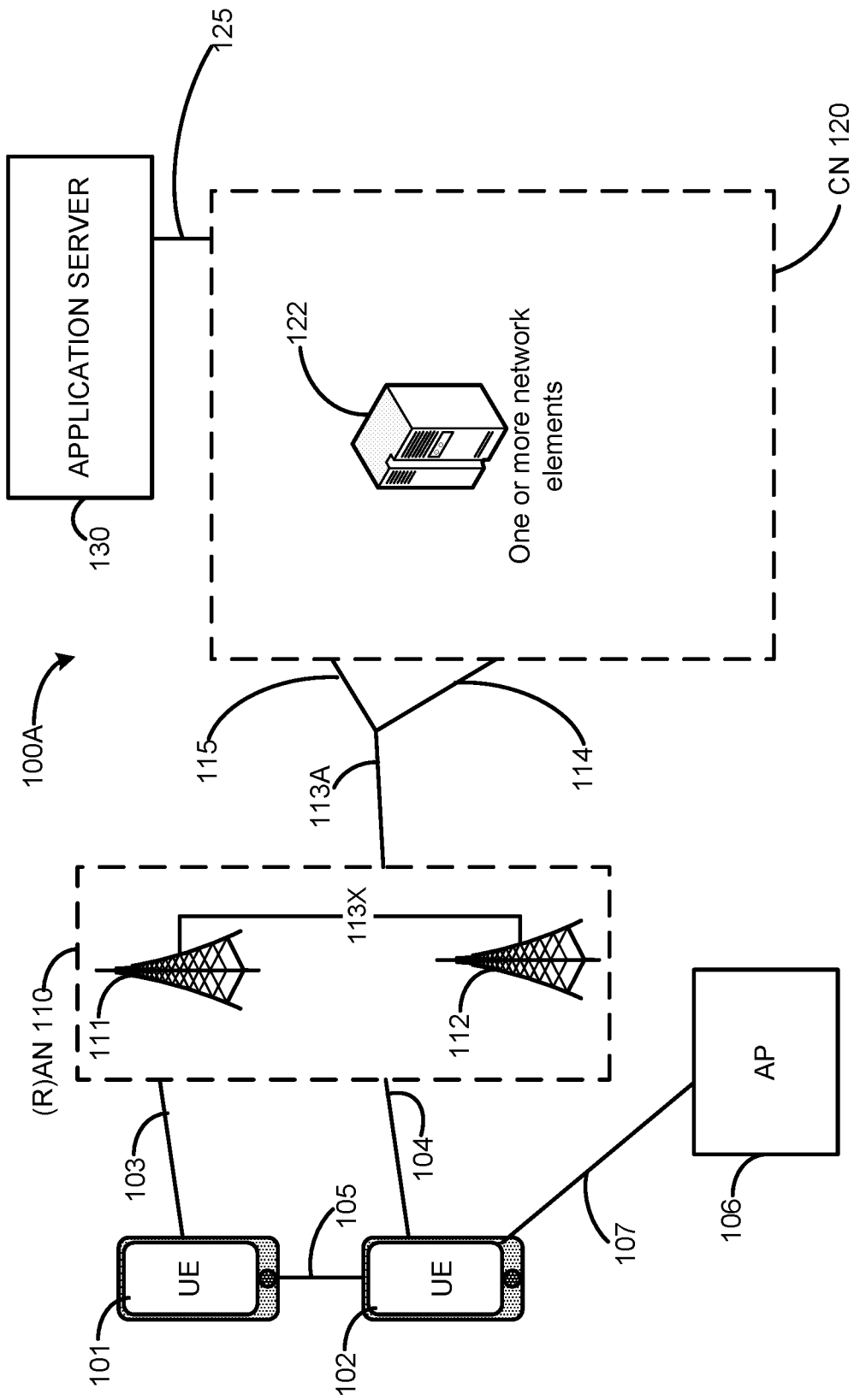
FIG. 1A illustrates an example system architecture of a network, in accordance with various embodiments.

Embodiments herein are related to situations in which a user equipment (UE) receives uplink (UL) grants on configured Licensed Assisted Access (LAA) secondary cells (SCells) indicating different PUSCH starting position within a same subframe. For example, Downlink Control Information (DCI) formats 0A, 0B, 4A and/or 4B may include a two-bit Physical Uplink Shared Channel (PUSCH) starting position field that indicates a starting position for transmitting UL data in a subframe. The possible PUSCH starting positions may include symbol 0, 25 us in symbol 0, (25+TA) us in symbol 0, and symbol 1. The DCI may indicate one out of four possible starting positions and, according to the current standards, there is no limitation on the possible combinations of PUSCH starting positions on different LAA SCells within a same subframe. Therefore, the UE could be required to transmit multiple UL transmissions at different starting positions within a same subframe. This may cause issues in LAA systems, when the UE is not capable of performing listen-before-talk (LBT) operations while in a transmission mode.

According to various embodiments, the UE is not expected to receive UL grants on LAA SCells indicating different PUSCH starting positions in the same subframe. In embodiments, when a UE receives UL grants indicating different PUSCH starting positions in the same subframe, the UE may align the PUSCH starting position to the earliest position among the indicated positions. In embodiments, when a UE receives UL grants indicating different PUSCH starting positions in the same subframe, the UE may align the PUSCH starting position to the latest position among the indicated positions. In embodiments, when a UE receives UL grants indicating different PUSCH starting positions in the same subframe, and if the UE is in a transmission mode to transmit PUSCH transmission on one or more LAA SCells, the UE may not be required to process the UL grants indicating PUSCH starting positions later in time. In these embodiments, the UE may not be required to perform LBT while in the transmission mode. In embodiments, if the UE fails LBT for all PUSCH starting positions earlier in time, the UE may continue to perform LBT for PUSCH starting positions later in time according to the UL grants. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Referring now to the figures, FIG. 1A illustrates an architecture of a system 100A of a network, in accordance with various embodiments. The following description is provided for an example system 100A that operates in conjunction with the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as Long Term Evolution (LTE), future (for example, Sixth Generation (6G)) systems, and the like.

As shown by FIG. 1A, the system 100A may include user equipment (UE) 101 and UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (for example, handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 101 and 102 can comprise an IoT UE, which can comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 101 and 102 may be configured to connect, for example, communicatively couple, with a access network (AN) or radio access network (RAN) 110. In embodiments, the RAN 110 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Spécial Mobile) EDGE (GSM Evolution) Radio Access Network). As used herein, the term "NG RAN" or the like may refer to a RAN 110 that operates in an NR or 5G system 100A, and the term "E-UTRAN" or the like may refer to a RAN 110 that operates in an LTE or 4G system 100A. The UEs 101 and 102 utilize connections (or channels) 103 and 104, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 101 and 102 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 (also referred to as also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (for example, connection 107) via Internet Protocol Security (IPsec) protocol tunneling to authenticate and encrypt packets (for example, internet protocol (IP) packets) sent over the connection 107. IPsec tunneling may include encapsulating entirety of original IP packets and adding a new packet header thereby protecting the original header of the IP packets.

The RAN 110 can include one or more AN nodes or RAN nodes 111 and 112 that enable the connections 103 and 104. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (for example, terrestrial access points) or satellite stations providing coverage within a geographic area (for example, a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 111/112 that operates in an NR or 5G system 100A (for example a gNB), and the term "E-UTRAN node" or the like may refer to a RAN node 111/112 that operates in an LTE or 4G system 100A (for example, an eNB). According to various embodiments, the RAN nodes 111 and/or 112 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 111 and/or 112 may be implemented as one or more software entities running on server computers as part of a virtual network, which may be referred to as a cloud radio access network (CRAN). In other embodiments, the RAN nodes 111 and 112 may represent individual gNB-distributed units (DUs) that are connected to a gNB-centralized unit (CU) via an F1 interface (not shown by FIG. 1A).

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (for example, for downlink communications) or a Single Carrier Frequency Division Multiple Access (SC-FDMA) communication technique (for example, for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101, 102 and the RAN nodes 111, 112 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101, 102 and the RAN nodes 111, 112 may operate using Licensed Assisted Access (LAA), enhanced LAA (eLAA), and/or further eLAA (feLAA) mechanisms. In these implementations, the UEs 101, 102 and the RAN nodes 111, 112 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101, 102, RAN nodes 111, 112, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE 101 or 102, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (μs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE 101, 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (for example, assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

As an example, a subframe may include multiple physical resource block (PRB) pairs of a PDCCH and/or an EPDCCH, where one or more of the PRB pairs may carrier control information intended for the UE 101, 102. This subframe may be one of ten 1 millisecond (ms) subframes within a radio frame that is 10 millisecond (ms). The radio frame may be a frame structure 1 (FS1) radio frame, a frame structure 2 (FS2) radio frame, or a frame structure 3 (FS3) radio frame. An OFDMA sub-carrier spacing for the radio frame in the frequency domain may be 15 kilohertz (kHz). Twelve of these sub-carriers together allocated during a 0.5 ms timeslot are called a resource block, which may include a PRB pair. A UE 101, 102 may be allocated, in the downlink or uplink, a minimum of two resources blocks during one subframe. According to existing standards, the PDSCH may be used for user data transmissions and the PDCCH and/or EPDCCH may be used for control information. The control information may specify the format of the data, and the location and timing of the radio resources allocated to the UE 101, 102 for transmitting or receiving data. The control information may be in the form of a Downlink Control Information (DCI) message. The DCI message may be identified by a radio network temporary identifier (RNTI) encoded in the DCI message.

A DCI message may transport downlink, uplink, or sidelink scheduling information, requests for aperiodic Channel Quality Indicator (CQI) reports, Licensed Assisted Access (LAA) common information, notifications of Multicast Control Channel (MCCH) changes, or uplink power control commands for one cell and one Radio Network Temporary Identifier (RNTI). The RNTI may be implicitly encoded in the cyclic redundancy check (CRC) bits of the DCI.

DCI may be conveyed using a plurality of DCI formats. In particular, DCI format 0A may be used for the scheduling of PUSCH transmissions in a LAA SCell; DCI format 0B may be used for the scheduling of PUSCH in each of multiple subframes in a LAA SCell; DCI format 4A may be used for the scheduling of PUSCH in a LAA SCell with multi-antenna port transmission mode; and DCI format 4B may be used for the scheduling of PUSCH with multi-antenna port transmission mode in each of multiple subframes in a LAA SCell. Each of DCI format 0A, 0B, 4A, and 4B may include, inter alia, a one bit channel access type field, a two bit channel access priority class field, and a PUSCH starting position comprising two bits with values as specified by table 1.

TABLE 1

| PUSCH starting position | |
|---|---|
| Value | PUSCH starting position |
| 00 | symbol 0 |
| 01 | 25 µs in symbol 0 |
| 10 | (25 + TA) µs in symbol 0 |
| 11 | symbol 1 |

Figure 1B:
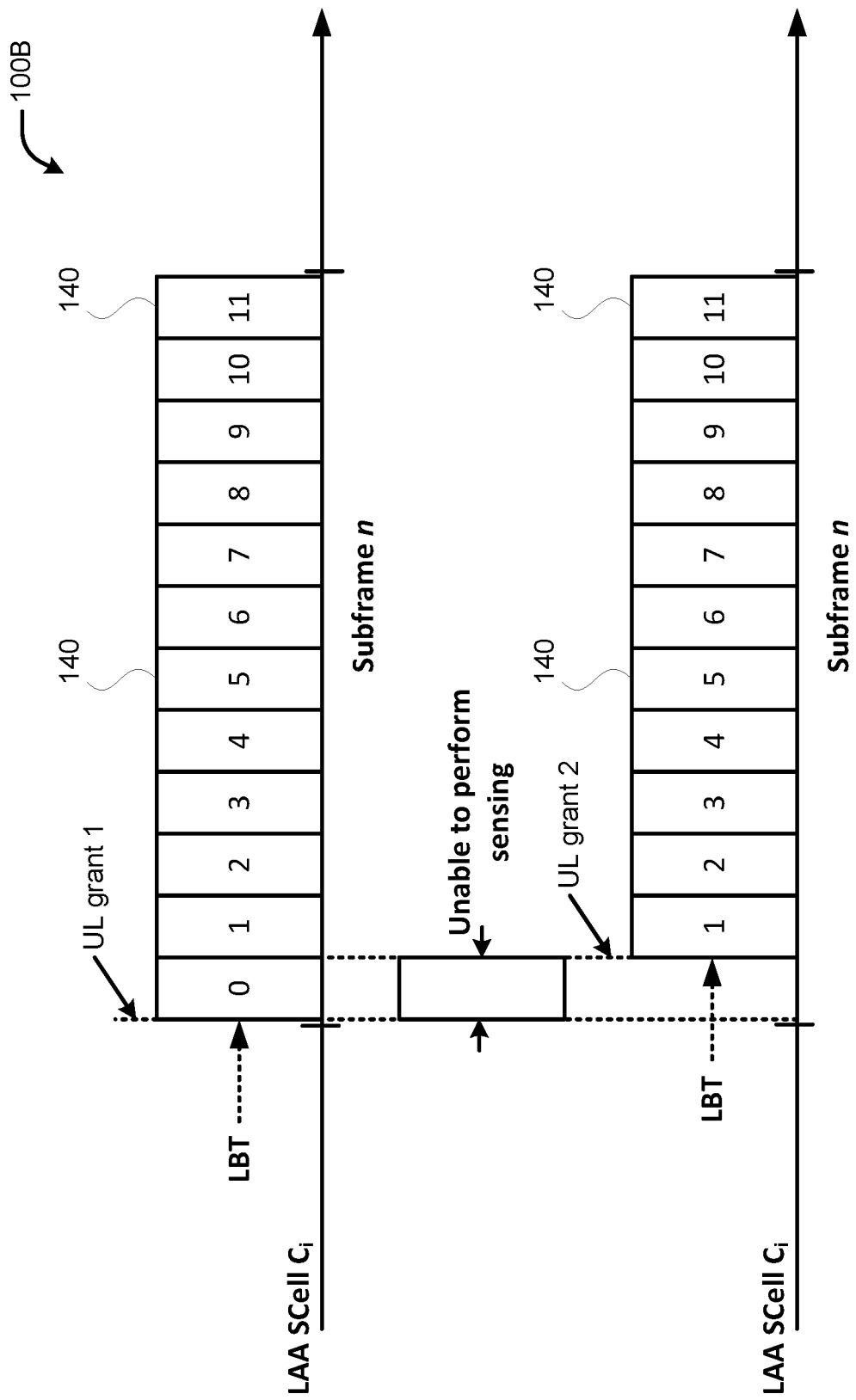
FIG. 1B shows an example scenario where a UE configured with more than one Licensed Assisted Access (LAA) Secondary Cells (SCells) and receives multiple UL grants indicating different Physical Uplink Shared Channel (PUSCH) starting positions.

As shown by FIG. 1B, issues may arise when the UE 101, 102 receives multiple UL grants on configured LAA SCells indicating different PUSCH starting positions within a same subframe.

FIG. 1B shows a scenario 100B where a UE 101, 102 is configured with more than one LAA SCells and receives multiple UL grants indicating different PUSCH starting positions. In FIG. 1B, the subframe n comprises a plurality of symbols 140 (labeled 1-11 in FIG. 1B). In this example, the UL grants received by the UE 101 may include a first UL grant ("UL grant 1" in FIG. 1B) to start from symbol 0 and a second UL grant ("UL grant 2" in FIG. 1B) to start from symbol 1. Prior to transmitting on the indicated symbol, the UE 101, 102 may perform LBT at the starting position to determine whether the channel is unoccupied. As discussed previously, the UL grants could indicate one out of four possible starting positions and, according to the current LTE standards, there is no limitation on the possible combinations of PUSCH starting positions on different LAA SCells within a same subframe.

One problem of the UL grants indicating different PUSCH starting positions is that the UE 101, 102 may already be in a transmission mode at the indicated PUSCH starting position later in time within the same subframe. For example, the UE 101, 102 may be in the transmission mode at the starting position for symbol 1 based on the UL grant 1. The UE 101, 102 performing LBT while in transmission mode may be considered equivalent to requiring the UE 101, 102 to be capable of simultaneous reception and transmission. However, most LTE-capable UEs are not required to be capable of simultaneous transmission and reception.

One example where such a problem may arise is when the subframe n is part of an FS2 radio frame, where multiple cells with different uplink-downlink configurations in the current radio frame are aggregated. This is because, when multiple cells with different uplink-downlink configurations in the current radio frame are aggregated and the UE 101, 102 is not capable of simultaneous reception and transmission in the aggregated cells, the UE 101, 102 may be constrained as follows:

if the subframe in the PCell is a DL subframe, the UE 101, 102 shall not transmit any signal or channel on an SCell in the same subframe;

if the subframe in the PCell is an UL subframe, the UE is not expected to receive any DL transmissions on an SCell in the same subframe; and/or if the subframe in the PCell is a special subframe and the same subframe in an SCell is a DL subframe, the UE 101, 102 is not expected to receive PDSCH/EPDCCH/PMCH/PRS transmissions in the SCell in the same subframe, and the UE 101, 102 is not expected to receive any other signals on the SCell in OFDM symbols that overlap with a guard period or Uplink Pilot Timeslot (UpPTS) in the PCell.

The embodiments discussed herein provide various mechanisms to remove considerations on simultaneous transmission and reception in eLAA UE implementations. In embodiments, the following relaxation may be applied: "A UE is not expected to receive UL grants on LAA SCells indicating different PUSCH starting positions in the same subframe."

In order to remove considerations on simultaneous transmission and reception in eLAA UE implementations, the following relaxations can be considered.

Embodiment 1: The UE 101, 102 is not expected to receive UL grants on LAA SCells indicating different PUSCH starting positions in the same subframe.

Embodiment 2: If UL grants indicating different PUSCH starting positions in the same subframe are received, the UE 101, 102 may align the PUSCH starting position to an earliest position among the indicated starting positions.

Embodiment 3: If UL grants indicating different PUSCH starting positions in the same subframe are received, the UE 101, 102 may aligns the PUSCH starting position to a latest position among the indicated starting positions.

Embodiment 4: If UL grants indicating different PUSCH starting positions in the same subframe are received and if the UE 101, 102 is in transmission of PUSCH on one LAA SCell, the UE 101, 102 is not required to process the UL grants indicating PUSCH starting positions later in time. In other words, the UE 101, 102 is not required to perform LBT while in the transmission mode. If the UE fails LBT for all PUSCH starting positions earlier in time, the UE will continue to perform LBT for PUSCH starting positions later in time according to the UL grants.

The above relaxations may only apply to the LAA SCells belonging to the same RF band, for example, intra-band CA. If a subset of aggregated LAA SCells belongs to different RF band(s), for example, inter-band CA, the UE 101, 102 may be able to simultaneously transmit and receive. For example, the UE 101, 102 may be able to process UL grants indicating different PUSCH starting positions.

According to various implementations of embodiments 1-4, the UE 101, 102 may operate as follows:

The UE 101, 102 may access a carrier on which LAA Scell(s) UL transmission(s) are performed according to one of type 1 or type 2 UL channel access procedures. The type 1 channel access procedure may be as follows:

The UE 101, 102 may perform a sensing operation and may transmit after sensing the channel to be idle during the slot durations of a defer duration $T_d$; and after the counter N is zero (see step 4). The counter N may be adjusted by sensing the channel for additional slot duration(s) according to the following steps:

1) set counter N to be $N=N_{init}$, where $N_{init}$ is a random number uniformly distributed between 0 and $CW_p$, and go to step 4, where $CW_p$ is a contention window adjustment that is based on a channel access priority class p on a carrier (see e.g., table 2);

2) if N>0 and the UE 101, 102 chooses to decrement the counter, set N=N-1;

3) sense the channel for an additional slot duration, and if the additional slot duration is idle, go to step 4; else, go to step 5;

4) if N=0, stop; else, go to step 2.

5) sense the channel until either a busy slot is detected within an additional defer duration $T_d$ or all the slots of the additional defer duration $T_d$ are detected to be idle; and 6) if the channel is sensed to be idle during all the slot durations of the additional defer duration $T_d$, go to step 4; else, go to step 5.

The type 2 channel access procedure may be as follows: If the UE 101, 102 uses the type 2 channel access procedure for a transmission including PUSCH, the UE 101, 102 may transmit the transmission including the PUSCH immediately after sensing the channel to be idle for at least a sensing interval $T_{short\_ul}=25$ µs. $T_{short\_ul}$ comprises a duration $T_f=16$ µs immediately followed by one slot duration $T_{sl}=9$ µs and $T_f$ includes an idle slot duration $T_{sl}$ at start of $T_f$. The channel is considered to be idle for $T_{short\_ul}$ if it is sensed to be idle during the slot durations of $T_{short\_ul}$.

The UE 101, 102 may use the type 1 or type 2 channel access procedure for transmitting transmissions including the PUSCH transmission when a UL grant scheduling a PUSCH transmission indicates the type 1 channel access procedure or the type 2 channel access procedure. The UE 101, 102 may also use the type 1 channel access procedure for transmitting sounding reference signal (SRS) transmissions not including a PUSCH transmission. A channel access priority class of p=1 may be used for UL SRS transmissions that do not include a PUSCH transmission.

If the UE 101, 102 is scheduled to transmit transmissions including PUSCH in a set subframes $n_0, n_1, \Lambda, n_{w-1}$ using PDCCH DCI Format 0B/4B, and if the UE 101, 102 cannot access the channel for a transmission in subframe $n_k$, the UE 101, 102 may attempt to make a transmission in subframe $n_{k+1}$ according to the channel access type indicated in the DCI, where $k \in \{0,1,\Lambda\ w-2\}$, and w is the number of scheduled subframes indicated in the DCI.

If the UE 101, 102 is scheduled to transmit transmissions without gaps including PUSCH in a set of subframes $n_0, n_1, \Lambda, n_{w-1}$ using one or more PDCCH DCI Format 0A/0B/4A/4B and the UE 101, 102 performs a transmission in subframe $n_k$ after accessing the carrier according to one of type 1 or type 2 UL channel access procedures, the UE 101, 102 may continue transmission in subframes after $n_k$ where $k \in \{0,1,\Lambda\ w-1\}$.

If the beginning of the UE transmission in subframe n+1 immediately follows the end of the UE transmission in subframe n, the UE 101, 102 is not expected to be indicated with different channel access types for the transmissions in those subframes.

If the UE 101, 102 is scheduled to transmit without gaps in subframes $n_0, n_1, \Lambda, n_{w-1}$ using one or more PDCCH DCI Format 0A/0B/4A/4B, and if the UE 101, 102 has stopped transmitting during or before subframe $n_{k1}$, $k1 \in \{0,1,\Lambda w-2\}$, and if the channel is sensed by the UE 101, 102 to be continuously idle after the UE 101, 102 has stopped transmitting, the UE 101, 102 may transmit in a later subframe $n_{k2}$, $k2 \in \{1,\Lambda w-1\}$ using type 2 channel access procedure. If the channel sensed by the UE is not continuously idle after the UE has stopped transmitting, the UE 101, 102 may transmit in a later subframe $n_{k2}$, $k2 \in \{1,\Lambda w-1\}$ using type 1 channel access procedure with the UL channel access priority class indicated in the DCI corresponding to subframe $n_{k2}$.

If the UE 101, 102 receives an UL grant and the DCI indicates a PUSCH transmission starting in subframe n using type 1 channel access procedure, and if the UE 101, 102 has an ongoing type 1 channel access procedure before subframe n, and:

if the UL channel access priority class value $p_1$ used for the ongoing type 1 channel access procedure is same or larger than the UL channel access priority class value $p_2$ indicated in the DCI, the UE 101, 102 may transmit the PUSCH transmission in response to the UL grant by accessing the carrier by using the ongoing type 1 channel access procedure.

if the UL channel access priority class value $p_1$ used for the ongoing type 1 channel access procedure is smaller than the UL channel access priority class value $p_2$ indicated in the DCI, the UE 101, 102 may terminate the ongoing channel access procedure.

If the UE 101, 102 is scheduled to transmit on a set of carriers C in subframe n, and if the UL grants scheduling PUSCH transmissions on the set of carriers C indicate type 1 channel access procedure, and if the same 'PUSCH starting position' is indicated for all carriers in the set of carriers C, and if the carrier frequencies of set of carriers C is a subset of one of a defined sets of carrier frequencies, then:

the UE 101, 102 may transmit on carrier $c_i \in C$ using type 2 channel access procedure, if type 2 channel access procedure is performed on carrier $c_i$ immediately before the UE transmission on carrier $c_i \in C$, $i \neq j$, and:

if the UE 101, 102 has accessed carrier $c_j$ using type 1 channel access procedure, where carrier $c_j$ is selected by the UE 101, 102 uniformly randomly from the set of carriers C before performing type 1 channel access procedure on any carrier in the set of carriers C.

As an implementation of embodiment 1, the UE 101, 102 may operate as follows: If the UE 101, 102 is scheduled to transmit on a set of carriers C in subframe n, where the carrier frequencies of set of carriers C is a subset of one of the defined sets of carrier frequencies, the UE 101, 102 is not expected to receive UL grants indicating different 'PUSCH starting positions' in the same subframe n.

A RAN node 111, 112 (e.g., an eNB) may indicate type 2 channel access procedure in the DCI of an UL grant scheduling transmission(s) including PUSCH on a carrier in subframe n when the eNB 111, 112 has transmitted on the carrier according to a channel access procedure discussed elsewhere, or the eNB 111, 112 may indicate using the 'UL duration and offset' field that the UE 101, 102 may perform a type 2 channel access procedure for transmissions(s) including PUSCH on a carrier in subframe n when the eNB 111, 112 has transmitted on the carrier according to the channel access procedure described elsewhere, or the eNB 111, 112 may schedule transmissions including PUSCH on a carrier in subframe n, that follows a transmission by the eNB 111, 112 on that carrier with a duration of $T_{short\_ul}=25$ μs, if subframe n occurs within the time interval starting at $t_0$ and ending at $t_0+T_{CO}$, where $T_{CO}=T_{mcot,p}+T_g$, where $t_0$ is the time instant when the eNB has started transmission, $T_{mcot,p}$ value is determined by the eNB 111, 112, and $T_g$ is the total duration of all gaps of duration greater than 25 μs that occur between the DL transmission of the eNB 111, 112 and UL transmissions scheduled by the eNB, and between any two UL transmissions scheduled by the eNB 111, 112 starting from $t_0$.

The eNB 111, 112 may schedule UL transmissions between $t_0$ and $t_0+T_{CO}$ in contiguous subframes if they can be scheduled contiguously. For an UL transmission on a carrier that follows a transmission by the eNB on that carrier within a duration of $T_{short\_ul}=25$ μs, the UE 101, 102 may use type 2 channel access procedure for the UL transmission. If the eNB 111, 112 indicates type 2 channel access procedure for the UE 101, 102 in the DCI, the eNB 111, 112 may indicate the channel access priority class used to obtain access to the channel in the DCI.

Referring back to FIG. 1A, the RAN nodes 111, 112 may be configured to communicate with one another via interface 113X. In embodiments where the system 100A is an LTE system, the interface 113X may be an X2 interface 113X. The X2 interface may be defined between two or more RAN nodes 111, 112 (for example, two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 101/102 from an SeNB for user data; information of PDCP PDUs that were not delivered to a UE 101/102; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100A is a 5G or NR system, the interface 113X may be an Xn interface 113X. The Xn interface is defined between two or more RAN nodes 111, 112 (for example, two or more gNBs and the like) that connect to 5GC 120, between a RAN node 111, 112 (for example, a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101/102 in a connected mode (for example, CM-CONNECTED) including functionality to manage the UE mobility for connected mode between one or more RAN nodes 211. The mobility support may include context transfer from an old (source) serving RAN node 111, 112 to new (target) serving RAN node 111, 112; and control of user plane tunnels between old (source) serving RAN node 111, 112 to new (target) serving RAN node 111, 112. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, Core Network (CN) 120. The CN 120 may comprise a plurality of network elements 122, which are configured to offer various data and telecommunications services to customers/subscribers (for example, users of UEs 101, 102) who are connected to the CN 120 via the RAN 110. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 120 may be implemented in one physical node or separate physical nodes including components to read and execute instructions from a machine-readable or computer-readable medium (for example, a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

In embodiments, the CN 120 may be a 5G CN (referred to as "5GC 120" or the like), while in other embodiments, the CN 120 may be an Evolved Packet Core (EPC). Where CN 120 is an EPC (referred to as "EPC 120" or the like), the RAN 110 may be connected with the CN 120 via an S1 interface 113A. In embodiments, the S1 interface 113A may be split into two parts, an S1 user plane (S1-U) interface 114, which carries traffic data between the RAN nodes 111 and 112 and the serving gateway (S-GW), and the S1-mobility management entity (MME) interface 115, which is a signaling interface between the RAN nodes 111 and 112 and MMEs.

In embodiments, the EPC 120 comprises the MMEs, the S-GW, the Packet Data Network (PDN) Gateway (P-GW), and a home subscriber server (HSS). The MMEs 121 may be similar in function to the control plane of legacy Serving General Packet Radio Service (GPRS) Support Nodes (SGSN). The MMEs may perform various mobility management (MM) procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 101, 102, provide user identity confidentiality, and/or other like services to users/subscribers. Each UE 101, 102 and the MME 121 may include an MM or EMM sublayer, and an MM context may be established in the UE 101, 102 and the MME when an attach procedure is successfully completed. The MM context may be a data structure or database object that stores MM-related information of the UE 101, 102.

The HSS may comprise a database for network users, including subscription-related information to support the network entities' handling of communication sessions. The EPC network 120 may comprise one or several HSSs 124, depending on the number of mobile subscribers, on the capacity of the equipment, on the organization of the network, etc. For example, the HSS can provide support for routing/roaming, authentication, authorization, naming/addressing resolution, location dependencies, etc.

The S-GW may terminate the S1 interface 113A towards the RAN 110, and routes data packets between the RAN 110 and the EPC 120. In addition, the S-GW may be a local mobility anchor point for inter-RAN node handovers and also may provide an anchor for inter-3GPP mobility. Other responsibilities may include lawful intercept, charging, and some policy enforcement. The P-GW may terminate an SGi interface toward a PDN. The P-GW may route data packets between the EPC network 123 and e2ernal networks such as a network including the application server 130 (alternatively referred to as application function (AF)) via an Internet Protocol (IP) interface 125. Generally, the application server 130 may be an element offering applications that use IP bearer resources with the core network (for example, UMTS Packet Services (PS) domain, LTE PS data services, etc.). In this embodiment, the P-GW is shown to be communicatively coupled to an application server 130 via an IP communications interface 125. The application server 130 can also be configured to support one or more communication services (for example, Voice-over-Internet Protocol (VoIP) sessions, PTT sessions, group communication sessions, social networking services, etc.) for the UEs 101 and 102 via the EPC 120.

The P-GW may further be a node for policy enforcement and charging data collection. Policy and Charging Enforcement Function (PCRF) is the policy and charging control element of the EPC 120. In a non-roaming scenario, there may be a single PCRF in the Home Public Land Mobile Network (HPLMN) associated with an RE's Internet Protocol Connectivity Access Network (IP-CAN) session. In a roaming scenario with local breakout of traffic, there may be two PCRFs associated with an RE's IP-CAN session, a Home PCRF (H-PCRF) within a HPLMN and a Visited PCRF (V-PCRF) within a Visited Public Land Mobile Network (VPLMN). The PCRF may be communicatively coupled to the application server 130 via the P-GW. The application server 130 may signal the PCRF to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Where CN 120 is a 5GC (referred to as "5GC 120" or the like), the RAN 110 may be connected with the CN 120 via an NG interface 113A. In embodiments, the NG interface 113A may be split into two parts, an NG user plane (NG-U) interface 114, which carries traffic data between the RAN nodes 111 and 112 and a user plane function (UPF), and the S1 control plane (NG-C) interface 115, which is a signaling interface between the RAN nodes 111 and 112 and Access and Mobility Functions (AMFs). Embodiments where the CN 120 is a 5GC 120 are discussed in more detail with regard to FIG. 2.

Figure 2:
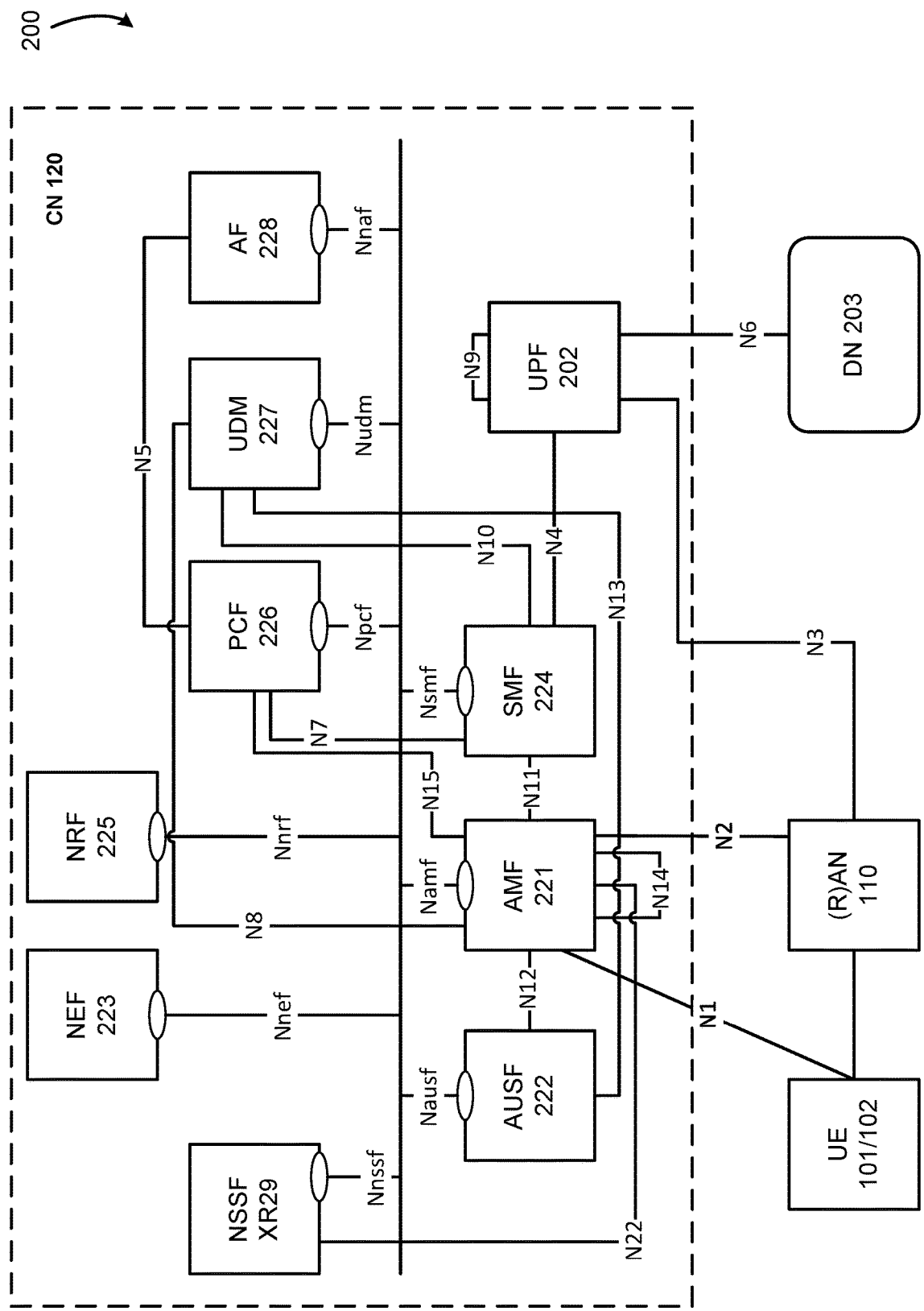
FIG. 2 illustrates another example system architecture of a network, in accordance with various embodiments

FIG. 2 illustrates an architecture of a system 200 of a 5G network in accordance with some embodiments. The system 200 is shown to include a UEs 101 and 102 (collectively referred to as "UEs 101/102" or "UE 101/102") discussed previously; a RAN 110 discussed previously, and which may include RAN nodes 111 and 112 discussed previously; and a Data network (DN) 203, which may be, for example, operator services, Internet access or 3rd party services; and a 5G Core Network (5GC or CN) 120.

The CN 120 may include an Authentication Server Function (AUSF) 222; an Access and Mobility Management Function (AMF) 221; a Session Management Function (SMF) 224; a Network Exposure Function (NEF) 223; a Policy Control function (PCF) 226; a Network Function (NF) Repository Function (NRF) 225; a Unified Data Management (UDM) 227; an Application Function (AF) 228; a User Plane Function (UPF) 202; and a Network Slice Selection Function (NSSF) 229.

The UPF 202 may act as an anchor point for intra-RAT and inter-RAT mobility, an external PDU session point of interconnect to DN 203, and a branching point to support multi-homed PDU session. The UPF 202 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (for example, SDF to QoS flow mapping), transport level packet marking in the uplink and downlink, and downlink packet buffering and downlink data notification triggering. UPF 202 may include an uplink classifier to support routing traffic flows to a data network. The DN 203 may represent various network operator services, Internet access, or third party services. NY 203 may include, or be similar to application server 130 discussed previously. The UPF 202 may interact with the SMF 224 via an N4 reference point between the SMF 224 and the UPF 202.

The AUSF 222 may store data for authentication of UE 101/102 and handle authentication related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The AMF 221 may be responsible for registration management (for example, for registering UE 101/102, etc.), connection management, reachability management, mobility management, and lawful interception of AMF-related events, and access authentication and authorization. The AMF 221 may be a termination point for the an N11 reference point between the AMF 221 and the SMF 224. The AMF 221 may provide transport for Session Management (SM) messages between the UE 101/102 and the SMF 224, and act as a transparent proxy for routing SM messages.

AMF 221 may also provide transport for short message service (SMS) messages between UE 101/102 and an SMS function (SMSF) (not shown by FIG. 2). AMF 221 may act as Security Anchor Function (SEA), which may include interaction with the AUSF 222 and the UE 101/102, receipt of an intermediate key that was established as a result of the UE 101/102 authentication process. Where USIM based authentication is used, the AMF 221 may retrieve the security material from the AUSF 222. AMF 221 may also include a Security Context Management (SCM) function, which receives a key from the SEA that it uses to derive access-network specific keys. Furthermore, AMF 221 may be a termination point of RAN CP interface, which may include or be an N2 reference point between the (R)AN 211 and the AMF 221; and the AMF 221 may be a termination point of NAS (N1) signalling, and perform NAS ciphering and integrity protection.

AMF 221 may also support NAS signalling with a UE 101/102 over an N3 interworking-function (IWF) interface. The N3IWF may be used to provide access to untrusted entities. N3IWF may be a termination point for the N2 interface between the (R)AN 211 and the AMF 221 for the control plane, and may be a termination point for the N3 reference point between the (R)AN 211 and the UPF 202 for the user plane. As such, the AMF 221 may handle N2 signalling from the SMF 224 and the AMF 221 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 101/102 and AMF 221 via an N1 reference point between the UE 101/102 and the AMF 221, and relay uplink and downlink user-plane packets between the UE 101/102 and UPF 202. The N3IWF also provides mechanisms for IPsec tunnel establishment with the UE 101/102. The AMF 221 may exhibit an Namf service-based interface, and may be a termination point for an N14 reference point between two AMFs 221 and an N17 reference point between the AMF 221 and a 5G-Equipment Identity Register (5G-EIR) (not shown by FIG. 2).

The UE 101/102 may need to register with the AMF 221 in order to receive network services. Registration Management (RM) is used to register or deregister the UE 221 with the network (for example, AMF 221), and establish a UE context in the network (for example, AMF 221). The UE 101/102 may operate in an RM-REGISTERED state or an RM-DEREGISTERED state. In the RM-DEREGISTERED state, the UE 101/102 is not registered with the network, and the UE context in AMF 221 holds no valid location or routing information for the UE 101/102 so the UE 101/102 is not reachable by the AMF 221. In the RM-REGISTERED state, the UE 101/102 is registered with the network, and the UE context in AMF 221 may hold a valid location or routing information for the UE 101/102 so the UE 101/102 is reachable by the AMF 221. In the RM-REGISTERED state, the UE 101/102 may perform mobility Registration Update procedures, perform periodic Registration Update procedure triggered by expiration of the periodic update timer (for example, to notify the network that the UE 101/102 is still active), and perform a Registration Update procedure to update UE capability information or to re-negotiate protocol parameters with the network, among others.

The AMF 221 may store one or more RM contexts for the UE 101/102, where each RM context is associated with a specific access to the network. The RM context may be a data structure, database object, etc. that indicates or stores, inter alia, a registration state per access type and the periodic update timer. The AMF 221 may also store a 5GC MM context that may be the same or similar to the (E)MM context discussed previously. In various embodiments, the AMF 221 may store a CE mode B Restriction parameter of the UE 101/102 in an associated MM context or RM context. The AMF 221 may also derive the value, when needed, from the UE's usage setting parameter {possible values: "Data Centric", "Voice Centric"} already stored in the UE context (and/or MM/RM Context).

Connection Management (CM) may be used to establish and release a signaling connection between the UE 101/102 and the AMF 221 over the N1 interface. The signaling connection is used to enable NAS signaling exchange between the UE 101/102 and the CN 120, and comprises both the AN signaling connection between the UE and the Access Network (AN) (for example, RRC connection or UE-N3IWF connection for Non-3GPP access) and the N2 connection for the UE 101/102 between the AN (for example, RAN 211) and the AMF 221. The UE 101/102 may operate in one of two CM states, CM-IDLE mode or CM-CONNECTED mode. When the UE 101/102 is operating in the CM-IDLE state/mode, the UE 101/102 may have no NAS signaling connection established with the AMF 221 over the N1 interface, and there may be (R)AN 211 signaling connection (for example, N2 and/or N3 connections) for the UE 101/102. When the UE 101/102 is operating in the CM-CONNECTED state/mode, the UE 101/102 may have an established NAS signaling connection with the AMF 221 over the N1 interface, and there may be a (R)AN 211 signaling connection (for example, N2 and/or N3 connections) for the UE 101/102. Establishment of an N2 connection between the (R)AN 211 and the AMF 221 may cause the UE 101/102 to transition from CM-IDLE mode to CM-CONNECTED mode, and the UE 101/102 may transition from the CM-CONNECTED mode to the CM-IDLE mode when N2 signaling between the (R)AN 211 and the AMF 221 is released.

The SMF 224 may be responsible for session management (for example, session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 224 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 224 may be included in the system 200, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (for example, AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using a standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF Discovery Requests from NF instances, and provide the information of the discovered NF instances to the NF instances. NRF 225 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 225 may exhibit the Nnrf service-based interface.

The PCF 226 may provide policy rules to control plane function(s) to enforce them, and may also support unified policy framework to govern network behaviour. The PCF 226 may also implement a front end (FE) to access subscription information relevant for policy decisions in a UDR of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 200 and/or CN 120 may also include an N24 reference point between the PCF 226 (in the home network) and a PCF 226 in a visited network. Additionally, the PCF 226 may exhibit an Npcf service-based interface.

The UDM 227 may handle subscription-related information to support the network entities' handling of communication sessions, and may store subscription data of UE 101/102. For example, subscription data may be communicated between the UDM 227 and the AMF 221 via an N8 reference point between the UDM 227 and the AMF 221 (not shown by FIG. 2). The UDM 227 may include two parts, an application FE and a User Data Repository (UDR) (the FE and UDR are not shown by FIG. 2). The UDR may store subscription data and policy data for the UDM 227 and the PCF 226, and/or structured data for exposure and application data (including Packet Flow Descriptions (PFDs) for application detection, application request information for multiple UEs 201) for the NEF 223. The Nudr service-based interface may be exhibited by the UDR 221 to allow the UDM 227, PCF 226, and NEF 223 to access a particular set of the stored data, as well as to read, update (for example, add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 224 via an N10 reference point between the UDM 227 and the SMF 224. UDM 227 may also support SMS management, wherein an SMS-FE implements the similar application logic as discussed previously. Additionally, the UDM 227 may exhibit the Nudm service-based interface.

The AF 228 may provide application influence on traffic routing, access to the Network Capability Exposure (NCE), and interact with the policy framework for policy control. The NCE may be a mechanism that allows the 5GC and AF 228 to provide information to each other via NEF 223, which may be used for edge computing implementations. In such implementations, the network operator and third party services may be hosted close to the UE 101/102 access point of attachment to achieve an efficient service delivery through the reduced end-to-end latency and load on the transport network. For edge computing implementations, the 5GC may select a UPF 202 close to the UE 101/102 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 101/102. The NSSF 229 may also determine allowed Network Slice Selection Assistance Information (NSSAI) and the mapping to the Subscribed Single-NSSAIs (S-NSSAIs), if needed. The NSSF 229 may also determine the AMF set to be used to serve the UE 101/102, or a list of candidate AMF(s) 221 based on a suitable configuration and possibly by querying the NRF 225. The selection of a set of network slice instances for the UE 101/102 may be triggered by the AMF 221 with which the UE 101/102 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2). Additionally, the NSSF 229 may exhibit an Nnssf service-based interface.

As discussed previously, the CN 120 may include an SMSF, which may be responsible for SMS subscription checking and verification, and relaying SM messages to/from the UE 101/102 to/from other entities, such as an SMS-GMSC/IWMSC/SMS-router. The SMS may also interact with AMF 221 and UDM 227 for notification procedure that the UE 101/102 is available for SMS transfer (for example, set a UE not reachable flag, and notifying UDM 227 when UE 101/102 is available for SMS).

The CN 120 may also include other elements that are not shown by FIG. 2, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (for example, UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2 for clarity. In one example, the CN 120 may include an Nx interface, which is an inter-CN interface between the MME (for example, MME 121) and the AMF 221 in order to enable interworking between CN 120 and CN 120. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

Figure 3:
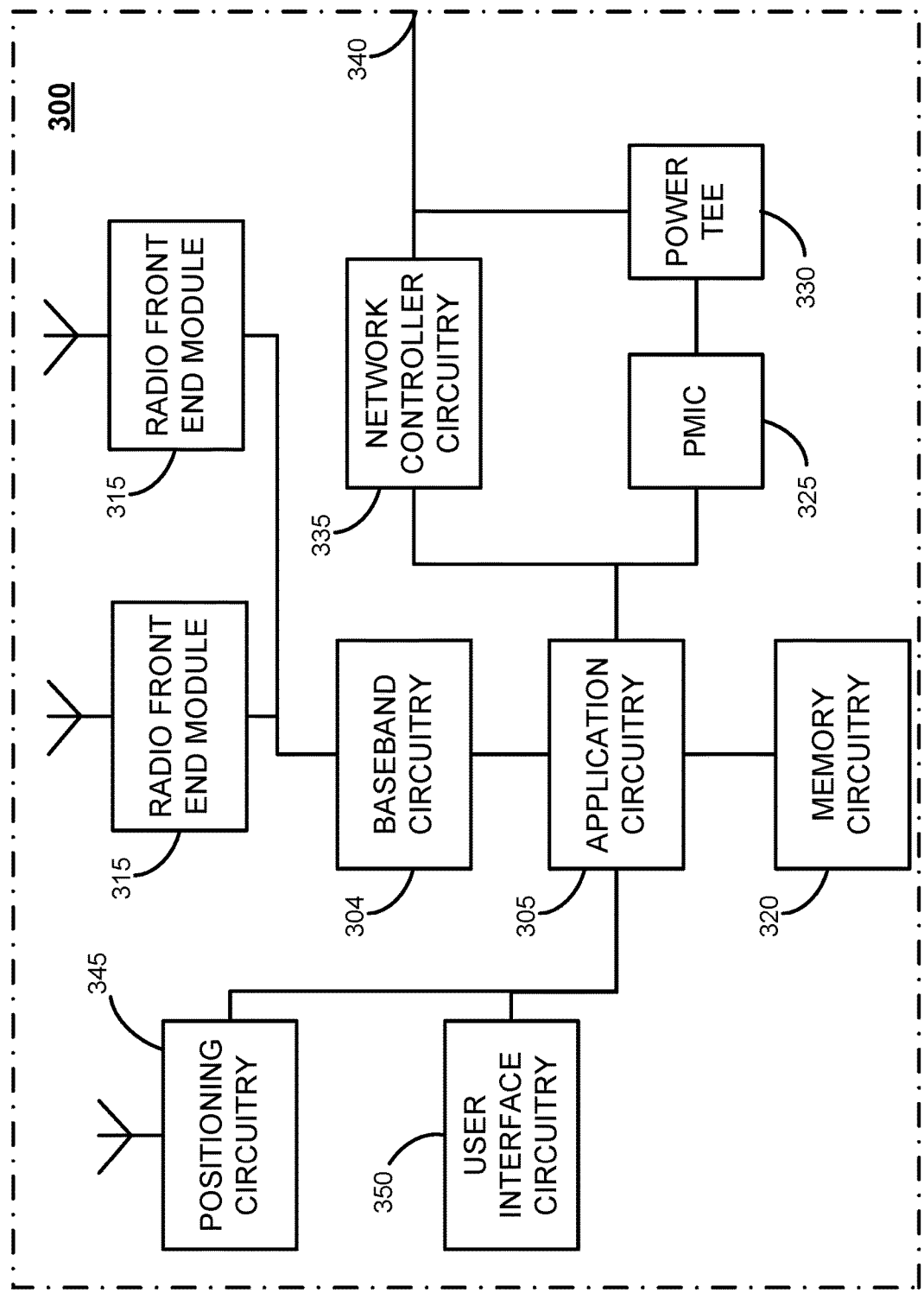
FIG. 3 depicts an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, RAN node, etc., such as the RAN nodes 111 and 112, and/or AP 106 shown and described previously. In other examples, the system 300 could be implemented in or by a UE or a core network node/entity, such as those shown and described with regard to FIGS. 1A-2. The system 300 may include one or more of application circuitry 305, baseband circuitry 304, one or more radio front end modules 315, memory 320, power management integrated circuitry (PMIC) 325, power tee circuitry 330, network controller 335, network interface connector 340, satellite positioning circuitry 345, and user interface 350. In some embodiments, the device 400 may include additional elements such as, for example, memory/storage, display, camera, sensor, or input/output (I/O) interface. In other embodiments, the components described below may be included in more than one device (for example, said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 305 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 300 may not utilize application circuitry 305, and instead may include a special-purpose processor/controller to process IP data received from an EPC or 5GC, for example.

Additionally or alternatively, application circuitry 305 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric including and other interconnected resources that may be programmed to perform various functions, such as the procedures, methods, functions, etc. of the various embodiments discussed herein. In such embodiments, the circuitry of application circuitry 305 may include memory cells (for example, erasable programmable read-only memory (EPROM), electrically erasable programmable read-only memory (EEPROM), flash memory, static memory (for example, static random access memory (SRAM), anti-fuses, etc.) used to store logic blocks, logic fabric, data, etc. in lookup-tables (LUTs) and the like.

The baseband circuitry 304 may be implemented, for example, as a solder-down substrate including one or more integrated circuits, a single packaged integrated circuit soldered to a main circuit board or a multi-chip module containing two or more integrated circuits. Although not shown, baseband circuitry 304 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 304 may include protocol processing circuitry with one or more instances of control circuitry (not shown) to provide control functions for the digital baseband circuitry and/or radio frequency circuitry (for example, the radio front end modules 315).

User interface circuitry 350 may include one or more user interfaces designed to enable user interaction with the system 300 or peripheral component interfaces designed to enable peripheral component interaction with the system 300. User interfaces may include, but are not limited to one or more physical or virtual buttons (for example, a reset button), one or more indicators (for example, light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 315 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocol. In some implementations, the network controller circuitry 335 may include multiple controllers to provide connectivity to other networks using the same or different protocols.

The positioning circuitry 345, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (for example, Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 may comprise various hardware elements (for example, including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (for example, positioning circuitry 345 and/or positioning circuitry implemented by UEs 101, 102, or the like) to determine their GNSS position. The GNSS signals may include a pseudorandom code (for example, a sequence of ones and zeros) that is known to the GNSS receiver and a message that includes a time of transmission (ToT) of a code epoch (for example, a defined point in the pseudorandom code sequence) and the GNSS node position at the ToT. The GNSS receivers may monitor/measure the GNSS signals transmitted/broadcasted by a plurality of GNSS nodes (for example, four or more satellites) and solve various equations to determine a corresponding GNSS position (for example, a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (for example, an offset of the GNSS receiver clock relative to the GNSS node time). In some embodiments, the positioning circuitry 345 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 345 may provide data to application circuitry 305 which may include one or more of position data or time data. Application circuitry 305 may use the time data to synchronize operations with other radio base stations (for example, RAN nodes 111, 112, 211 or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an $I^2C$ interface, an SPI interface, point to point interfaces, and a power bus, among others.

Figure 4:
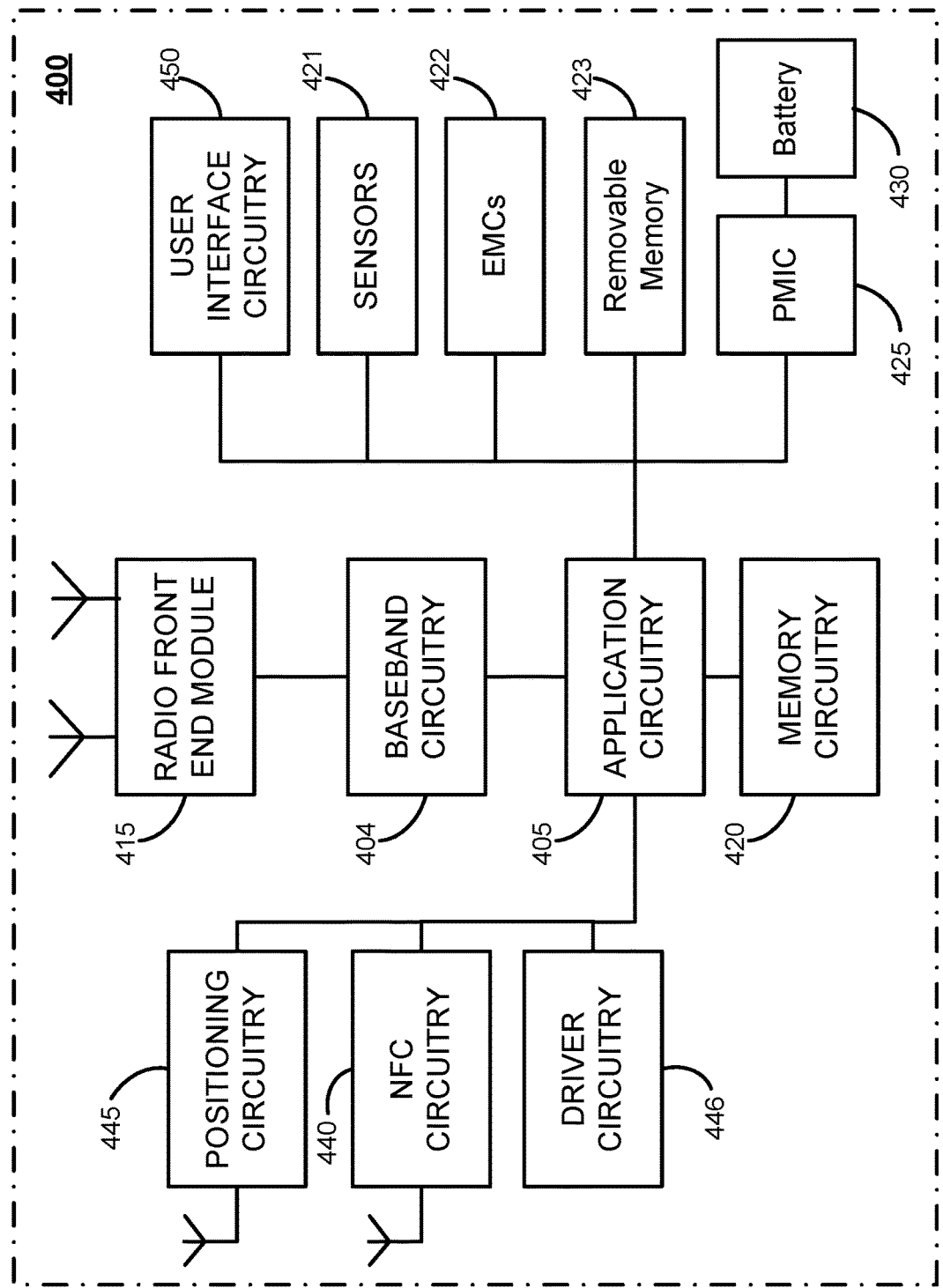
FIG. 4 depicts example components of a computer platform in accordance with various embodiments

FIG. 4 illustrates an example of a platform 400 (or "device 400") in accordance with various embodiments. In embodiments, the computer platform 400 may be suitable for use as UEs 101, 102, 201, application servers 130, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (for example, graphics processors, application processors, etc.). The processors (or cores) may be coupled with or may include memory/storage and may be configured to execute instructions stored in the memory/storage to enable various applications or operating systems to run on the platform 400. In some embodiments, processors of application circuitry 305/405 may process IP data packets received from an EPC or 5GC.

Application circuitry 405 be or include a microprocessor, a multi-core processor, a multithreaded processor, an ultra-low voltage processor, an embedded processor, or other known processing element. In one example, the application circuitry 405 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s)

from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation.

Additionally or alternatively, application circuitry 405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may comprise logic blocks or logic fabric including and other interconnected resources that may be programmed to perform various functions, such as the procedures, methods, functions, etc. of the various embodiments discussed herein. In such embodiments, the circuitry of application circuitry 405 may include memory cells (for example, erasable programmable read-only memory (EPROM), electrically erasable programmable read-only memory (EEPROM), flash memory, static memory (for example, static random access memory (SRAM), anti-fuses, etc.) used to store logic blocks, logic fabric, data, etc. in lookup-tables (LUTs) and the like.

The baseband circuitry 404 may be implemented, for example, as a solder-down substrate including one or more integrated circuits, a single packaged integrated circuit soldered to a main circuit board or a multi-chip module containing two or more integrated circuits. Although not shown, baseband circuitry 404 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 404 may include protocol processing circuitry with one or more instances of control circuitry (not shown) to provide control functions for the digital baseband circuitry and/or radio frequency circuitry (for example, the radio front end modules 415).

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 420 s storage 108 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (for example, Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including electromechanical relays (EMRs) and/or solid state relays (SSRs), actuators (for example, valve actuators, etc.), an audible sound generator, a visual warning device, motors (for example, DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445, which may be the same or similar as the positioning circuitry 445 discussed with regard to FIG. 3.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425" or the like) may manage power provided to various components of the platform 400. In particular, with respect to the baseband circuitry 404, the PMIC 425 may control power-source selection, voltage scaling, battery charging, or DC-to-DC conversion. The PMIC 425 may often be included when the platform 400 is capable of being powered by a battery 430, for example, when the device is included in a UE 101, 102, 201.

In some embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block 128 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I$^2$C interface, an SPI interface, point to point interfaces, and a power bus, among others.

Figure 5:
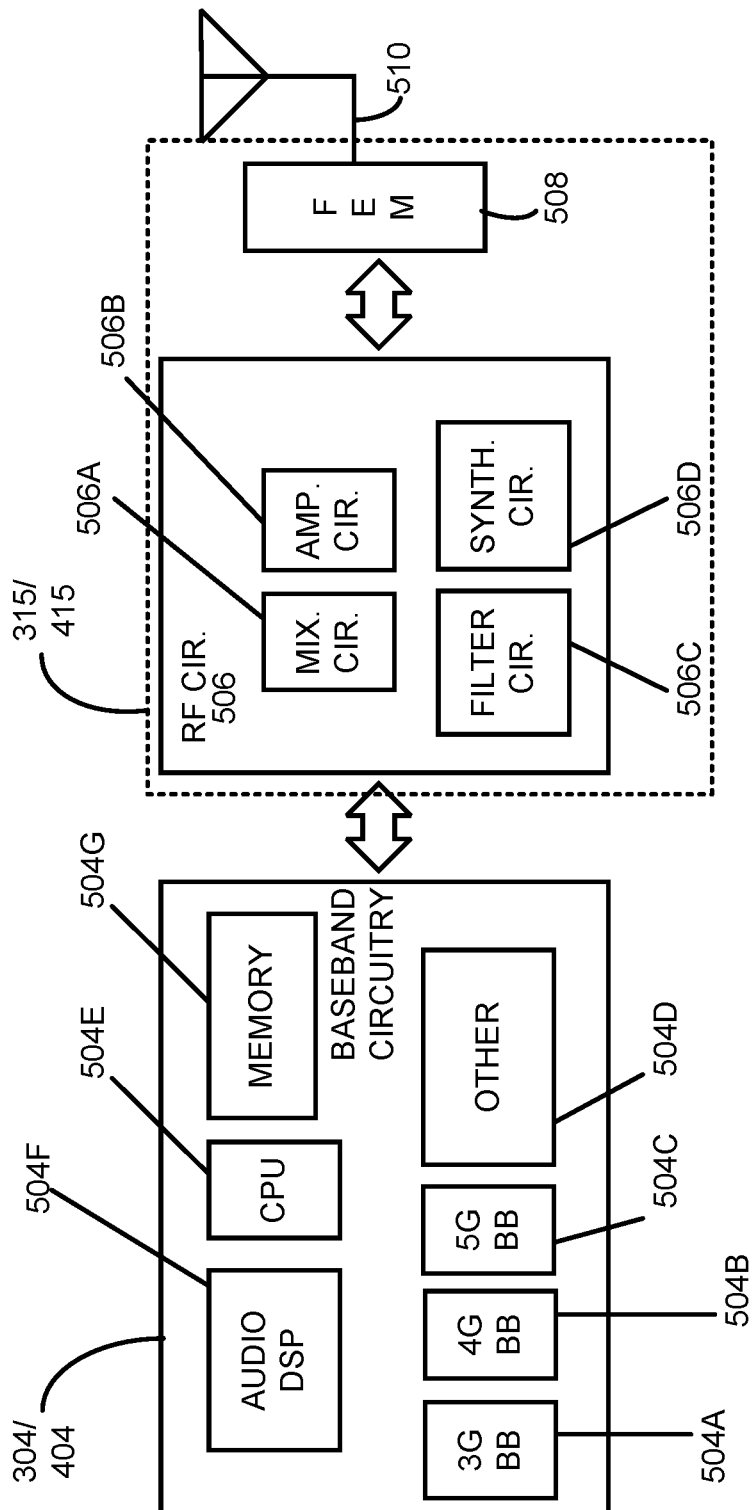
FIG. 5 depicts example components of baseband circuitry and radio frequency circuitry in accordance with various embodiments.

FIG. 5 illustrates example components of baseband circuitry 304/404 and radio front end modules (RFEM) 315/415 in accordance with some embodiments. As shown, the RFEM 315/415 may include Radio Frequency (RF) circuitry 506, front-end module (FEM) circuitry 508, one or more antennas 510 coupled together at least as shown.

The baseband circuitry 304/404 may include circuitry such as, but not limited to, one or more single-core or multi-core processors. The baseband circuitry 304/404 may include one or more baseband processors or control logic to process baseband signals received from a receive signal path of the RF circuitry 506 and to generate baseband signals for a transmit signal path of the RF circuitry 506. Baseband processing circuity 304/404 may interface with the application circuitry 305/405 for generation and processing of the baseband signals and for controlling operations of the RF circuitry 506. For example, in some embodiments, the baseband circuitry 304/404 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (for example, second generation (2G), si5h generation (6G), etc.). The baseband circuitry 304/404 (for example, one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 304/404 may include Fast-Fourier Transform (FFT), precoding, or constellation mapping/demapping functionality. In some embodiments, encoding/decoding circuitry of the baseband circuitry 304/404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304/404 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304/404 and the application circuitry 305/405 may be implemented together such as, for example, on a system on a chip (SOC).

In some embodiments, the baseband circuitry 304/404 may provide for communication compatible with one or more radio technologies. For example, in some embodiments, the baseband circuitry 304/404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 304/404 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 304/404. RF circuitry 506 may also include a transmit signal path which may include circuitry to up-convert baseband signals provided by the baseband circuitry 304/404 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 304/404 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 304/404 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (for example, Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 304/404 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 304/404 or the applications processor 305/405 depending on the desired output frequency. In some embodiments, a divider control input (for example, N) may be determined from a look-up table based on a channel indicated by the applications processor 305/405.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (for example, based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (for example, to the RF circuitry 506). The transmit signal path of the FEM circuitry 508 may include a power amplifier (PA) to amplify input RF signals (for example, provided by RF circuitry 506), and one or more filters to generate RF signals for subsequent transmission (for example, by one or more of the one or more antennas 510).

Processors of the application circuitry 305/405 and processors of the baseband circuitry 304/404 may be used to execute elements of one or more instances of a protocol stack. For example, processors of the baseband circuitry 304/404, alone or in combination, may be used execute Layer 3, Layer 2, or Layer 1 functionality, while processors of the baseband circuitry 304/404 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
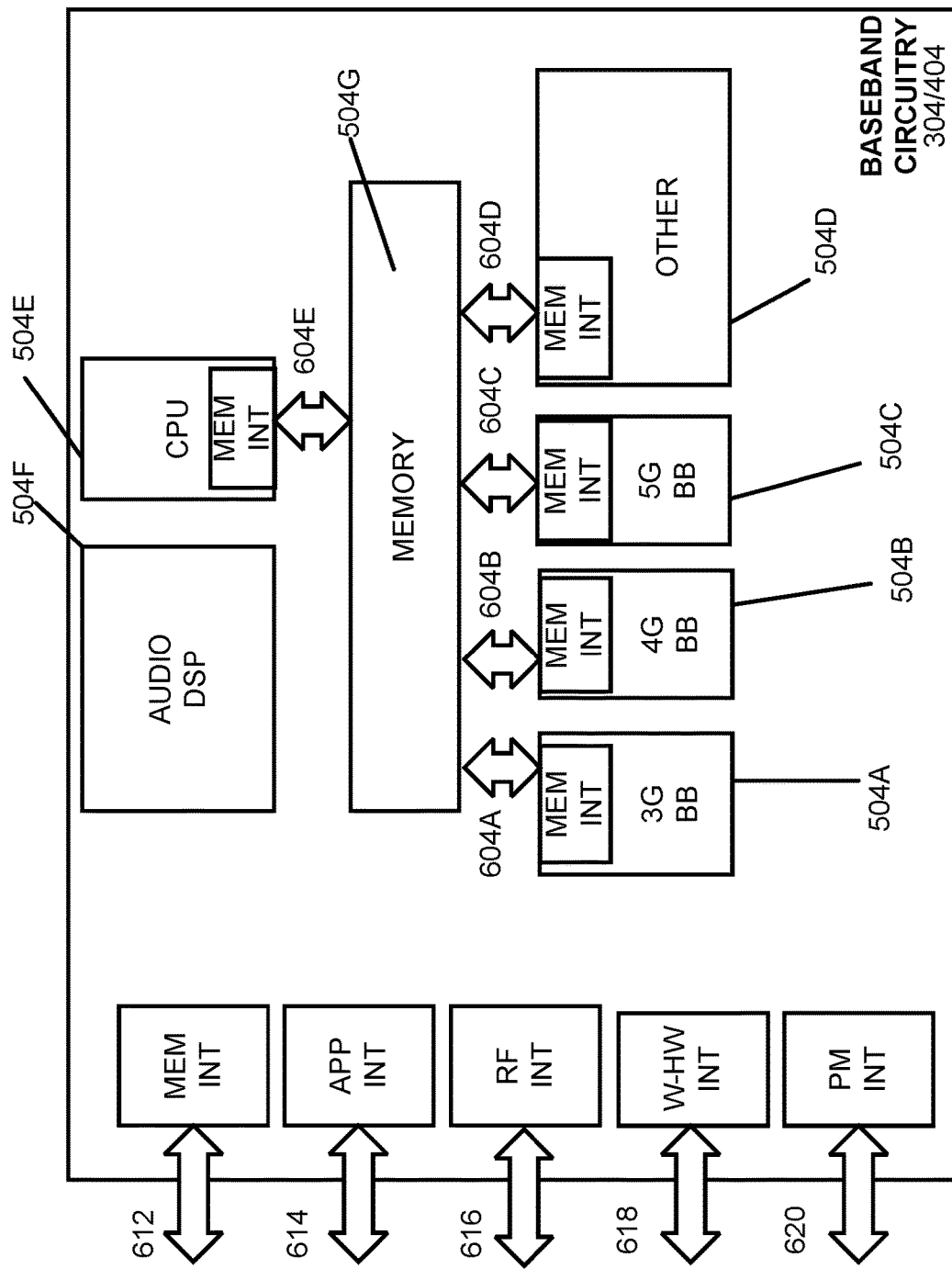
FIG. 6 depicts example interfaces of baseband circuitry in accordance with various embodiments.

FIG. 6 illustrates example interfaces of baseband circuitry in accordance with some embodiments. As discussed above, the baseband circuitry 304/404 of FIGS. 3-4 may comprise processors 504A-504E and a memory 504G utilized by said processors. Each of the processors 504A-504E may include a memory interface, 604A-604E, respectively, to send/receive data to/from the memory 504G.

The baseband circuitry 304/404 may further include one or more interfaces to communicatively couple to other circuitries/devices, such as a memory interface 612 (for example, an interface to send/receive data to/from memory external to the baseband circuitry 304/404), an application circuitry interface 614 (for example, an interface to send/receive data to/from the application circuitry 305/405 of FIGS. 3-4), an RF circuitry interface 616 (for example, an interface to send/receive data to/from RF circuitry 506 of FIG. 5), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals to/from the PMIC 425.

Figure 7:
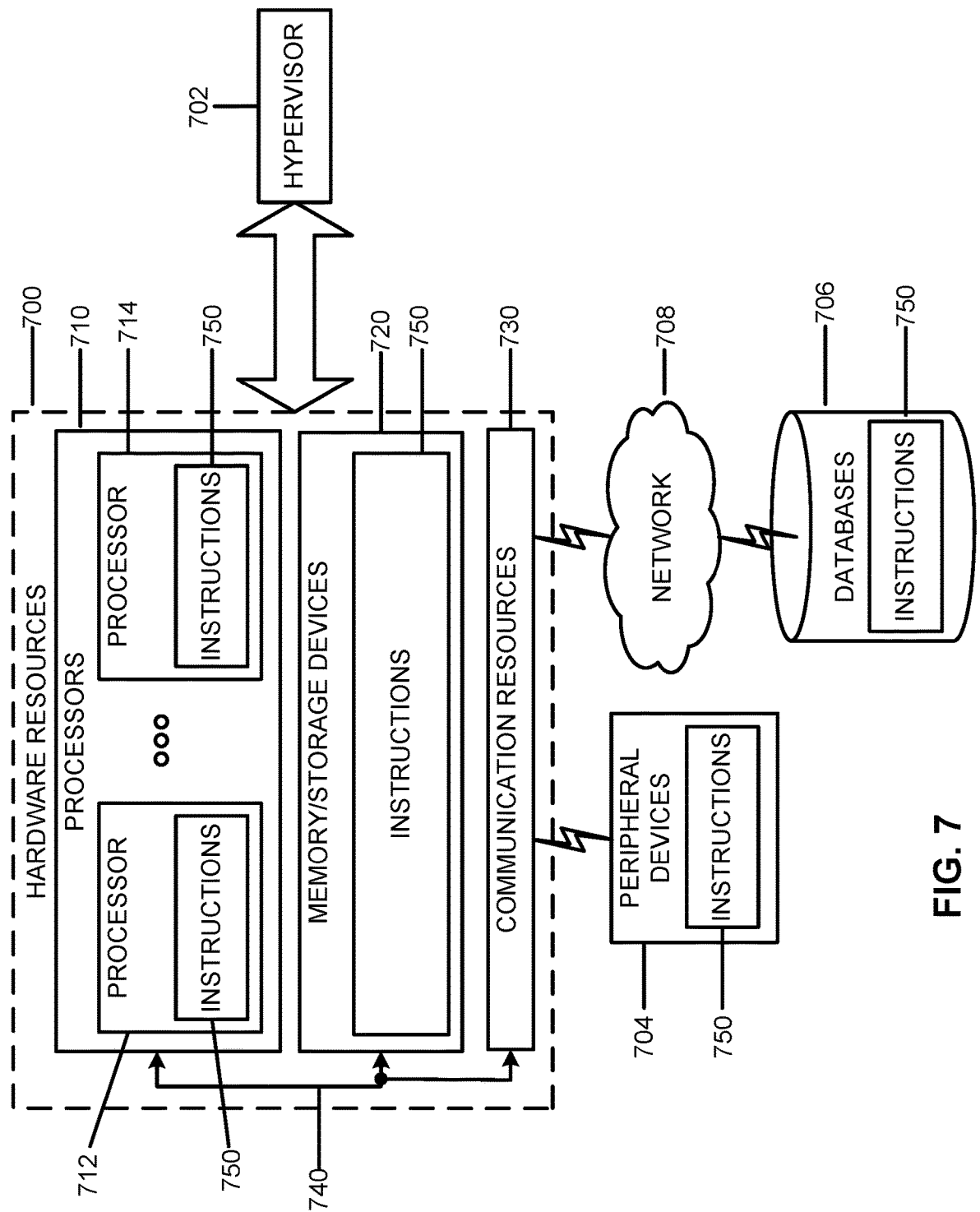
FIG. 7 depicts example components capable to perform any one or more of the methodologies discussed herein, according to various example embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (for example, NFV) is utilized, a hypervisor 702 may be executed to provide an execution environment for one or more network slices/sub-slices to utilize the hardware resources 700. A "virtualized resource" may refer to compute, storage, and/or network resources provided by virtualization infrastructure to an application, device, system, etc.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
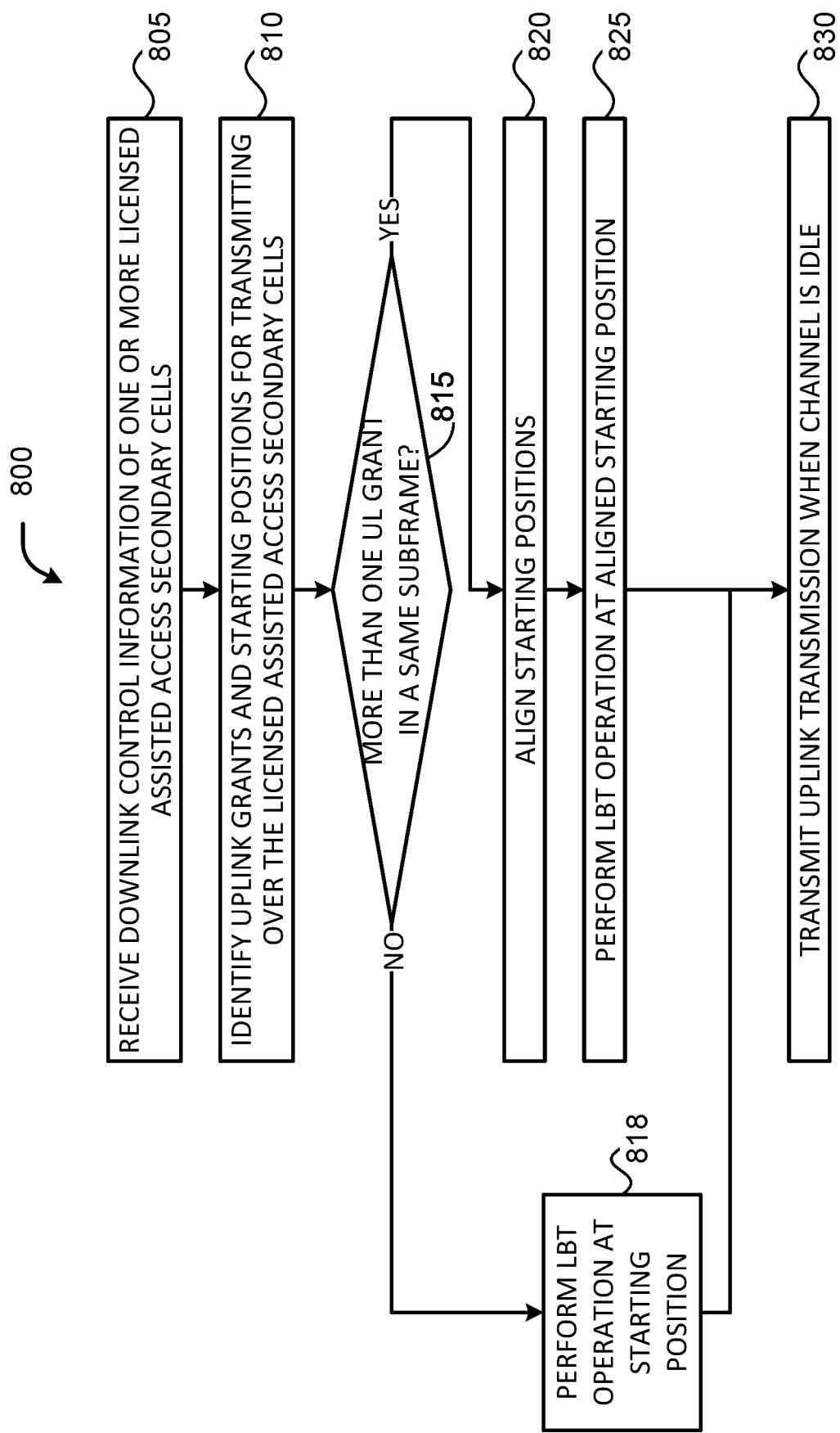
FIG. 8 shows an example process for handling multiple uplink (UL) grants on configured LAA SCells indicating different PUSCH starting positions in accordance with various embodiments.
Figure 9:
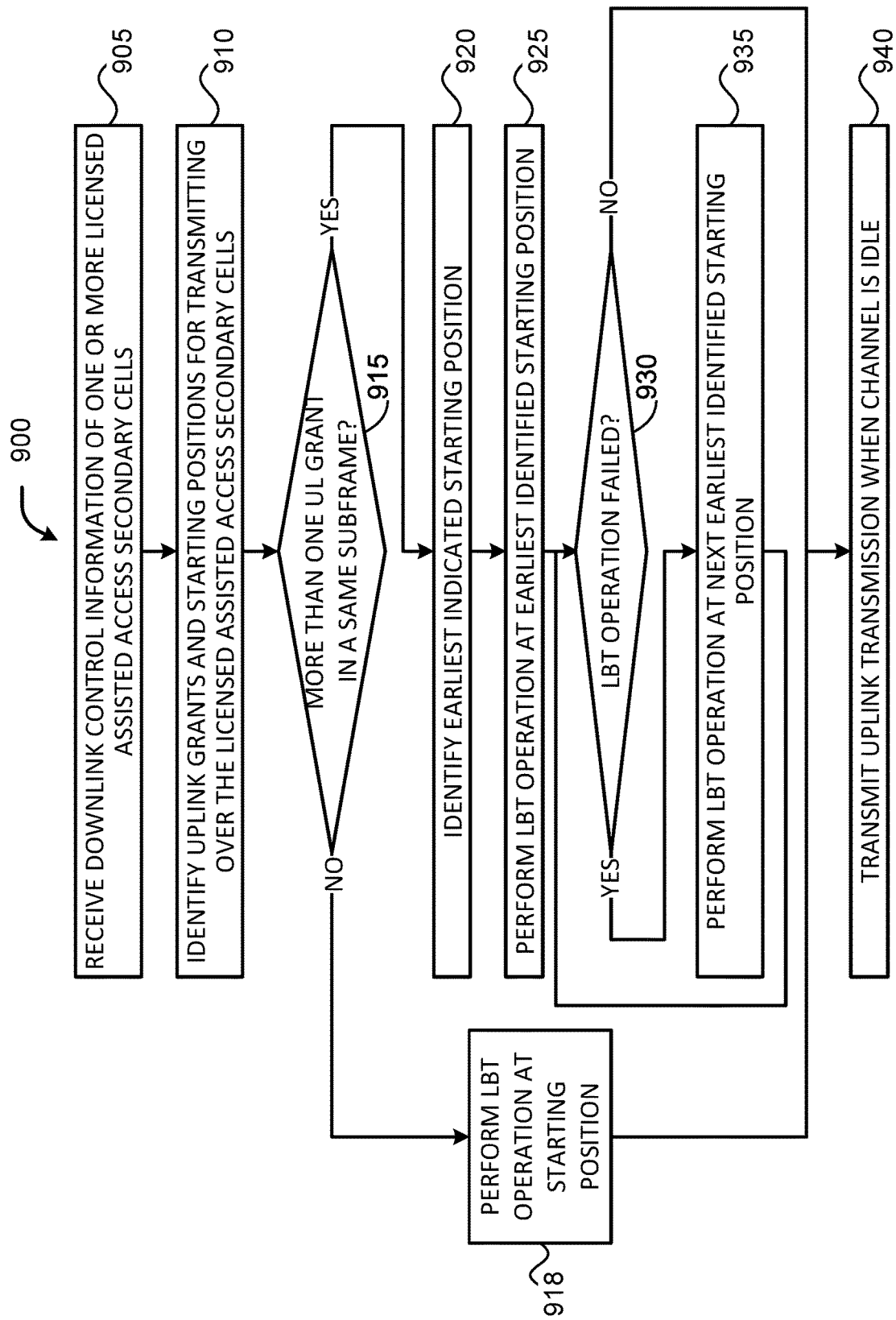
FIG. 9 shows another example process for handling multiple UL grants on configured LAA SCells indicating different PUSCH starting positions in accordance with various embodiments.

FIGS. 8-9 illustrate processes 800-900, respectively, for handling multiple UL grants on configured LAA SCells indicating different PUSCH starting positions, according to various embodiments. For illustrative purposes, the operations of processes 800-900 are described as being performed by a UE 101 with a RAN node 111, and/or various components discussed with regard to FIGS. 4-6. However, process 800-900 may be performed by various other devices discussed with regard to FIGS. 1A-7. Moreover, while particular examples and orders of operations are illustrated in FIGS. 8-9, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 8 shows an example procedure 800 for handling multiple UL grants on configured LAA SCells indicating different PUSCH starting positions. Procedure 800 may begin at operation 805 where communications circuitry of UE 101 (for example, RFEM 415 of FIGS. 4-5, RF circuitry 506 of FIG. 5, or the like) may receive Downlink Control Information (DCI) of one or more Licensed Assisted Access (LAA) Secondary Cells (SCells). In embodiments, processor circuitry of the UE 101 (for example, baseband circuitry 404 of FIGS. 4-5) may monitor a control region of a primary serving cell (PCell), where the control region comprises a set of Control Channel Elements (CCEs) or enhanced CCEs (ECCEs) of a PDCCH or EPDCCH, respectively. In embodiment, the CCEs/ECCEs may be referred to as PDCCH candidate or EPDCCH candidates, and the processor circuitry may monitor a set of (E)PDCCH candidates for the DCI on a PCell operating in a licensed spectrum as configured by higher layer signaling. The term "monitoring," as used herein, may imply attempting by the processor circuitry of the UE 101 to decode each of the (E)PDCCH candidates according to various DCI formats. In embodiments, the DCI may be transmitted by the RAN node 111 according to a selected one of DCI format 0A, 0B, 4A, or 4B.

At operation 810, the processor circuitry of the UE 101 may identify uplink (UL) grants and starting positions for transmitting over the LAA SCells. In embodiments, the processor circuitry may identify the starting positions based on a value of the Physical Uplink Shared Channel (PUSCH) starting position field in the DCI, which is discussed previously with regard to table 1. The possible PUSCH starting positions may include symbol 0, 25 µs in symbol 0, (25+a timing advance (TA))µs in symbol 0, and symbol 1.

At operation 815, the processor circuitry of the UE 101 may determine whether more than one UL grant is indicated within a same subframe. If at operation 815 the processor circuitry determines that more than one UL grant are not indicated within a same subframe, then the processor circuitry may proceed to operation 818 to perform a listen-before-talk (LBT) operation at the indicated starting position and may then proceed to operation 830 to control the communication circuitry of the UE 101 to transmit the UL transmission when the channel is detected to be idle.

If at operation 815 the processor circuitry determines that more than one UL grant are indicated within a same subframe, then the processor circuitry may proceed to operation 820 align the multiple indicated starting positions. According to various embodiments, the UE 101 is not expected to receive UL grants on LAA SCells indicating different PUSCH starting positions in the same subframe. However, handling of UL grants indicating different PUSCH starting positions in the same subframe may be up to UE 101 implementation since full duplex capability is not mandated.

According to first embodiments, the processor circuitry may align the PUSCH starting positions to an earliest starting position among the indicated PUSCH starting positions for handling UL grants indicating different PUSCH starting positions in the same subframe. According to second embodiments, the processor circuitry may align the PUSCH starting positions to a latest starting position among the indicated PUSCH starting positions. In the first and second embodiments, the processor circuitry of the UE 101 may align the starting positions by adjusting the UL transmission timing for the PUSCH using a timing advance (TA). The TA may be a fixed timing offset or a timing offset between UL and DL radio frames, subframes, or symbols at the UE 101. In some first embodiments, the processor circuitry of the UE 101 may align each UL transmission to be spaced apart by the TA starting from the earliest starting position among the indicated PUSCH starting positions. In some second embodiments, the processor circuitry of the UE 101 may align each UL transmission to be spaced apart by the TA starting from the latest starting position among the indicated PUSCH starting positions. For example, if the TA is 25 μs, the processor circuitry of the UE 101 may align each UL transmission to be 25 μs apart from one another beginning at the earliest indicated starting position or the latest indicated starting position. In various embodiments, the TA may be predefined or preconfigured at the UE 101, and in other embodiments, the TA may be signaled to the UE 101 using higher layer signaling (for example, using a suitable RRC message). Other mechanisms for aligning the starting positions may be used in other embodiments.

After aligning the starting positions at operation 820, the processor circuitry of the UE 101 may proceed to operation 825 to perform an LBT operation at the aligned starting position, and may then proceed to operation 830 to control the communication circuitry of the UE 101 to transmit the UL transmission when the channel is detected to be idle. After performance of operation 818 or operation 830, process 800 may end or repeat as necessary.

FIG. 9 shows another example procedure 900 for handling multiple UL grants on configured LAA SCells indicating different PUSCH starting positions. Procedure 900 may begin at operation 905 where communications circuitry of UE 101 (for example, RFEM 415 of FIGS. 4-5, RF circuitry 506 of FIG. 5, or the like) may receive DCI of one or more LAA SCells. At operation 910, the processor circuitry of the UE 101 may identify UL grants and starting positions for transmitting over the LAA SCells. At operation 915, the processor circuitry of the UE 101 may determine whether more than one UL grant is indicated within a same subframe. If at operation 915 the processor circuitry determines that more than one UL grant are not indicated within a same subframe, then the processor circuitry may proceed to operation 918 to perform a listen-before-talk (LBT) operation at the indicated starting position and may then proceed to operation 930 to control the communication circuitry of the UE 101 to transmit the UL transmission when the channel is detected to be idle. Operations 905, 910, 915, and 918 may be performed in a same or similar manner as discussed previously with regard to operations 805, 810, 815, and 818 of FIG. 8.

If at operation 915 the processor circuitry determines that more than one UL grant are indicated within a same subframe, then the processor circuitry may proceed to operation 920 identify an earliest indicated starting position. At operation 925, the processor circuitry of the UE 101 may control the communication circuitry to perform an LBT operation at the earliest identified starting position.

At operation 930, the processor circuitry may determine whether the LBT operation failed, or whether the sensed channel was determined not to be idle or unoccupied. If at operation 930 the processor circuitry determines that the LBT operation has not failed, the processor circuitry may proceed to operation 940 to control the communication circuitry to transmit the UL transmission on the unoccupied channel at the earliest starting position.

If at operation 930 the processor circuitry determines that the LBT operation has failed or determines that the channel is occupied, the processor circuitry may proceed to operation 935 to perform an LBT at a next earliest identified starting position of the indicated starting positions. After performance of operation 935, the processor circuitry may proceed back to operation 930 to determine whether the LBT operation at the next earliest identified starting position has failed or not, and may then operate as discussed previously. After performance of operation 918 and/or operation 940, process 900 may end or repeat as necessary.

Some non-limiting examples are provided infra. The following examples pertain to further embodiments. Specifics in the examples may be used anywhere in one or more embodiments discussed previously. All optional features of devices described herein may also be implemented with respect to one or more methods or processes, and vice versa.

Example 1 may include one or more computer-readable storage media (CRSM) including instructions, wherein execution of the instructions by one or more processors of a user equipment (UE) is to cause the UE to: control receipt of Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; and align the different starting positions to provide for the UE to transmit uplink transmissions according to the at least two uplink grants while the UE is in a transmission mode.

Example 2 may include the one or more CRSM of example 1 and/or some other examples herein, wherein execution of the instructions is to cause the UE to align the different starting positions to an earliest starting position among the indicated starting positions.

Example 3 may include the one or more CRSM of example 1 and/or some other examples herein, wherein execution of the instructions is to cause the UE to align the different starting positions to a latest starting position among the indicated starting positions.

Example 4 may include the one or more CRSM of examples 1-3 and/or some other examples herein, wherein execution of the instructions is to cause the UE to control performance of a listen-before-talk (LBT) operation at the aligned starting positions prior to transmission of the PUSCH transmissions.

Example 5 may include the one or more CRSM of example 1 and/or some other examples herein, wherein execution of the instructions is to cause the UE to: identify an earliest starting position among the indicated starting positions; control performance of an LBT operation at the earliest starting position; and control non-performance of an LBT operation at other starting positions among the indicated starting positions.

Example 6 may include the one or more CRSM of example 5 and/or some other examples herein, wherein execution of the instructions is to cause the UE to control performance of an LBT operation at each indicated starting position, in turn, when the LBT operated performed at the earliest starting position is determined to have failed.

Example 7 may include the one or more CRSM of example 1 and/or some other examples herein, wherein the UE is not capable of simultaneous reception and transmission.

Example 8 may include the one or more CRSM of example 7 and/or some other examples herein, wherein the subframe is part of a Frame Structure type 2 (FS2) radio frame or part of a Frame Structure type 3 (FS3) radio frame.

Example 9 may include the one or more CRSM of examples 1-8 and/or some other examples herein, wherein the DCI is a DCI format 0A message, a DCI format 0B message, a DCI format 4A message, or a DCI format 4B message.

Example 10 may include the one or more CRSM of example 9 and/or some other examples herein, wherein the DCI comprises individual two bit PUSCH starting position fields for each indicated starting position, wherein the individual two bit PUSCH starting position fields are to include: a value of "00" to indicate a starting position of symbol 0; a value of "01" to indicate a starting position of 25 microseconds (us) in symbol 0; a value of "10" to indicate a starting position of 25 µs plus a timing advance (TA) in symbol 0; or a value of "11" to indicate a starting position of symbol 1.

Example 11 may include a system on chip (SoC) to be implemented in a user equipment (UE) the SoC comprising: baseband circuitry and memory circuitry, the baseband circuitry to: control receipt of Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; control storage of each of the at least two uplink grants in the memory circuitry; and align the different starting positions to provide for the UE to transmit uplink transmissions according to the at least two uplink grants while the UE is in a transmission mode.

Example 12 may include the SoC of example 11 and/or some other examples herein, wherein, to align the different starting positions, the baseband circuitry is to: align the different starting positions to an earliest starting position among the indicated starting positions. Example 13 may include the SoC of example 11 and/or some other examples herein, wherein, to align the different starting positions, the baseband circuitry is to: align the different starting positions to a latest starting position among the indicated starting positions.

Example 14 may include the SoC of examples 11-13 and/or some other examples herein, wherein the baseband circuitry is to: perform a listen-before-talk (LBT) operation at the aligned starting positions prior to transmission of the PUSCH transmissions.

Example 15 may include the SoC of example 11 and/or some other examples herein, wherein, to align the different starting positions, the baseband circuitry is to: identify an earliest starting position among the indicated starting positions; control performance of an LBT operation at the earliest starting position; and not perform an LBT operation at other starting positions among the indicated starting positions.

Example 16 may include the SoC of example 15 and/or some other examples herein, wherein the baseband circuitry is to: control performance of LBT operation at each indicated starting position, in turn, when the LBT performed at the earliest starting position is determined to have failed.

Example 17 may include the SoC of example 11 and/or some other examples herein, wherein the UE is not capable of simultaneous reception and transmission, and wherein the subframe is part of a Frame Structure type 2 (FS2) radio frame or part of a Frame Structure type 3 (FS3) radio frame.

Example 18 may include the SoC of examples 11-17 and/or some other examples herein, wherein the DCI is a DCI format 0A message, a DCI format 0B message, a DCI format 4A message, or a DCI format 4B message, and wherein the DCI comprises individual two bit PUSCH starting position fields for each indicated starting position, wherein the individual two bit PUSCH starting position fields are to include: a value of "00" to indicate a starting position of symbol 0; a value of "01" to indicate a starting position of 25 microseconds (µs) in symbol 0; a value of "10" to indicate a starting position of 25 µs plus a timing advance (TA) in symbol 0; or a value of "11" to indicate a starting position of symbol 1.

Example 19 may include an apparatus to be employed as a user equipment (UE) the apparatus comprising: communication means for receiving Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; and processing means for: performing a decode attempt on a set of Physical Downlink Control Channel (PDCCH) candidates or a set of enhanced PDCCH (EPDCCH) candidates to obtain the DCI, and aligning the different starting positions to provide for the UE to transmit uplink transmissions according to the at least two uplink grants while the UE is in a transmission mode.

Example 20 may include the apparatus of example 19 and/or some other examples herein, wherein the processing means is for aligning the different starting positions to an earliest starting position among the indicated starting positions or align the different starting positions to a latest starting position among the indicated starting positions.

Example 21 may include the apparatus of examples 19-20 and/or some other examples herein, wherein the communication means is for performing a listen-before-talk (LBT) operation at the aligned starting positions prior to transmission of the PUSCH transmissions.

Example 22 may include the apparatus of example 19 and/or some other examples herein, wherein the processing means is for identifying an earliest starting position among the indicated starting positions, and the communication means is for performing an LBT operation at the earliest starting position; and for not performing an LBT operation at other starting positions among the indicated starting positions.

Example 23 may include the apparatus of example 22 and/or some other examples herein, wherein the communication means is for performing an LBT operation at each indicated starting position, in turn, when the LBT operated performed at the earliest starting position is determined to have failed.

Example 24 may include the apparatus of example 19 and/or some other examples herein, wherein the UE is not capable of simultaneous reception and transmission, and wherein the subframe is part of a Frame Structure type 2 (FS2) radio frame or part of a Frame Structure type 3 (FS3) radio frame.

Example 25 may include the apparatus of examples 19-24 and/or some other examples herein, wherein the DCI is a DCI format 0A message, a DCI format 0B message, a DCI format 4A message, or a DCI format 4B message, and wherein the DCI comprises individual two bit PUSCH starting position fields for each indicated starting position, wherein the individual two bit PUSCH starting position fields are to include: a value of "00" to indicate a starting position of symbol 0; a value of "01" to indicate a starting position of 25 microseconds (us) in symbol 0; a value of "10" to indicate a starting position of 25 µs plus a timing advance (TA) in symbol 0; or a value of "11" to indicate a starting position of symbol 1.

Example 26 may include an apparatus to be employed as a user equipment (UE) the apparatus comprising: communication circuitry to receive Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; and processor circuitry communicatively coupled with the communication circuitry, the processor circuitry is to: perform a decode attempt on a set of Physical Downlink Control Channel (PDCCH) candidates or a set of enhanced PDCCH (EPDCCH) candidates to obtain the DCI, and align the different starting positions to provide for the UE to transmit uplink transmissions according to the at least two uplink grants while the UE is in a transmission mode.

Example 27 may include the apparatus of example 26 and/or some other examples herein, wherein the processor circuitry is to align the different starting positions to an earliest starting position among the indicated starting positions or align the different starting positions to a latest starting position among the indicated starting positions.

Example 28 may include the apparatus of examples 26-27 and/or some other examples herein, wherein the communication circuitry is to perform a listen-before-talk (LBT) operation at the aligned starting positions prior to transmission of the PUSCH transmissions.

Example 29 may include the apparatus of example 26 and/or some other examples herein, wherein: the processor circuitry is to identify an earliest starting position among the indicated starting positions, and the communication circuitry is to perform an LBT operation at the earliest starting position; and for not performing an LBT operation at other starting positions among the indicated starting positions.

Example 30 may include the apparatus of example 29 and/or some other examples herein, wherein the processor circuitry is to control the communication circuitry to perform an LBT operation at each indicated starting position, in turn, when the LBT operated performed at the earliest starting position is determined to have failed.

Example 31 may include the apparatus of example 26 and/or some other examples herein, wherein the UE is not capable of simultaneous reception and transmission, and wherein the subframe is part of a Frame Structure type 2 (FS2) radio frame or part of a Frame Structure type 3 (FS3) radio frame.

Example 32 may include the apparatus of examples 26-31 and/or some other examples herein, wherein the DCI is a DCI format 0A message, a DCI format 0B message, a DCI format 4A message, or a DCI format 4B message, and wherein the DCI comprises individual two bit PUSCH starting position fields for each indicated starting position, wherein the individual two bit PUSCH starting position fields are to include: a value of "00" to indicate a starting position of symbol 0; a value of "01" to indicate a starting position of 25 microseconds (μs) in symbol 0; a value of "10" to indicate a starting position of 25 μs plus a timing advance (TA) in symbol 0; or a value of "11" to indicate a starting position of symbol 1.

Example 33 may include an apparatus to be employed as a user equipment (UE) the apparatus comprising: communication means for receiving Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; and alignment means for aligning the different starting positions to provide for the UE to transmit uplink transmissions according to the at least two uplink grants while the UE is in a transmission mode.

Example 34 may include the apparatus of example 33 and/or some other examples herein, wherein the alignment means is for aligning the different starting positions to an earliest starting position among the indicated starting positions.

Example 35 may include the apparatus of example 33 and/or some other examples herein, wherein the alignment means is for aligning the different starting positions to a latest starting position among the indicated starting positions.

Example 36 may include the apparatus of examples 33-35 and/or some other examples herein, wherein the communication means is for performing a listen-before-talk (LBT) operation at the aligned starting positions prior to transmission of the PUSCH transmissions.

Example 37 may include the apparatus of example 33 and/or some other examples herein, further comprising: identification means for identifying an earliest starting position among the indicated starting positions, and wherein the communication means is for: performing an LBT operation at the earliest starting position; and not performing an LBT operation at other starting positions among the indicated starting positions.

Example 38 may include the apparatus of example 37 and/or some other examples herein, wherein the communication means is for performing an LBT operation at each indicated starting position, in turn, when the LBT operated performed at the earliest starting position is determined to have failed.

Example 39 may include the apparatus of example 33 and/or some other examples herein, wherein the UE is not capable of simultaneous reception and transmission, and wherein the subframe is part of a Frame Structure type 2 (FS2) radio frame or part of a Frame Structure type 3 (FS3) radio frame.

Example 40 may include the apparatus of examples 33-39 and/or some other examples herein, wherein the DCI is a DCI format 0A message, a DCI format 0B message, a DCI format 4A message, or a DCI format 4B message, wherein the DCI comprises individual two bit PUSCH starting position fields for each indicated starting position, wherein the individual two bit PUSCH starting position fields are to include: a value of "00" to indicate a starting position of symbol 0; a value of "01" to indicate a starting position of 25 microseconds (us) in symbol 0; a value of "10" to indicate a starting position of 25 μs plus a timing advance (TA) in symbol 0; or a value of "11" to indicate a starting position of symbol 1.

Example 41 may include a method comprising: receiving or causing to receive Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; and aligning or causing to align the different starting positions to provide for the UE to transmit uplink transmissions according to the at least two uplink grants while the UE is in a transmission mode.

Example 42 may include the method of example 41 and/or some other examples herein, further comprising: aligning or causing to align the different starting positions to an earliest starting position among the indicated starting positions.

Example 43 may include the method of example 41 and/or some other examples herein, further comprising: aligning or causing to the different starting positions to a latest starting position among the indicated starting positions.

Example 44 may include the method of examples 41-43 and/or some other examples herein, further comprising: performing or causing to perform a listen-before-talk (LBT) operation at the aligned starting positions prior to transmission of the PUSCH transmissions.

Example 45 may include the method of example 41 and/or some other examples herein, further comprising: identifying or causing to identify an earliest starting position among the indicated starting positions; performing or causing to perform an LBT operation at the earliest starting position; and not performing or causing to not perform an LBT operation at other starting positions among the indicated starting positions.

Example 46 may include the method of example 45 and/or some other examples herein, further comprising: performing or causing to perform an LBT operation at each indicated starting position, in turn, when the LBT operated performed at the earliest starting position is determined to have failed.

Example 47 may include the method of example 41 and/or some other examples herein, wherein the UE is not capable of simultaneous reception and transmission.

Example 48 may include the method of example 47 and/or some other examples herein, wherein the subframe is part of a Frame Structure type 2 (FS2) radio frame or part of a Frame Structure type 3 (FS3) radio frame.

Example 49 may include the method of examples 41-48 and/or some other examples herein, wherein the DCI is a DCI format 0A message, a DCI format 0B message, a DCI format 4A message, or a DCI format 4B message.

Example 50 may include the method of example 49 and/or some other examples herein, wherein the DCI comprises individual two bit PUSCH starting position fields for each indicated starting position, wherein the individual two bit PUSCH starting position fields are to include: a value of "00" to indicate a starting position of symbol 0; a value of "01" to indicate a starting position of 25 microseconds (μs) in symbol 0; a value of "10" to indicate a starting position of 25 μs plus a timing advance (TA) in symbol 0; or a value of "11" to indicate a starting position of symbol 1.

Example 51 may include may include the method of examples 41-50 and/or some other examples herein, further comprising: storing or causing to store each of the at least two uplink grants in the memory circuitry.

Example 52 may include may include the method of examples 41-51 and/or some other examples herein, further comprising: performing or causing to perform a decode attempt on a set of Physical Downlink Control Channel (PDCCH) candidates or a set of enhanced PDCCH (EPDCCH) candidates to obtain the DCI.

Example 53 may include may include the method of examples 44-52 and/or some other examples herein, wherein the LBT operation comprises: sensing or causing to sense a radiofrequency energy of a transmission band for a period of time; and determining whether the radiofrequency energy is greater than or equal to a threshold value.

Example 54 may include an apparatus comprising means to perform one or more elements of a method described in or related to any of examples 1-53, or any other method or process described herein.

Example 55 may include one or more non-transitory computer-readable media comprising instructions to cause an electronic device, upon execution of the instructions by one or more processors of the electronic device, to perform one or more elements of a method described in or related to any of examples 1-53, or any other method or process described herein.

Example 56 may include an apparatus comprising logic, modules, or circuitry to perform one or more elements of a method described in or related to any of examples 1-53, or any other method or process described herein.

Example 57 may include a method, technique, or process as described in or related to any of examples 1-53, or portions or parts thereof.

Example 58 may include an apparatus comprising: one or more processors and one or more computer readable media comprising instructions that, when executed by the one or more processors, cause the one or more processors to perform the method, techniques, or process as described in or related to any of examples 1-53, or portions thereof.

Example 59 may include a signal as described in or related to any of examples 1-53, or portions or parts thereof.

Example 60 may include a signal in a wireless network as shown and described herein. Example 61 may include a method of communicating in a wireless network as shown and described herein. Example 62 may include a system for providing wireless communication as shown and described herein. Example 63 may include a device for providing wireless communication as shown and described herein.

The foregoing description of the above examples provides illustration and description for the example embodiments disclosed herein, but the above examples are not intended to be exhaustive or to limit the scope of the invention to the precise form disclosed. Modifications and variations are possible in light of the above teachings and/or may be acquired from practice of various implementations of the embodiments discussed herein.

The invention claimed is:

1. One or more non-transitory, computer-readable storage media (NTCRSM) including instructions, wherein execution of the instructions by one or more processors of a user equipment (UE) is to cause the UE to:
control receipt of Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; and
align the different starting positions to provide for the UE to transmit uplink transmissions according to the at least two uplink grants while the UE is in a transmission mode.

2. The one or more NTCRSM of claim 1, wherein execution of the instructions is to cause the UE to align the different starting positions to an earliest starting position among the indicated starting positions.

3. The one or more NTCRSM of claim 1, wherein execution of the instructions is to cause the UE to align the different starting positions to a latest starting position among the indicated starting positions.

4. The one or more NTCRSM of claim 1, wherein execution of the instructions is to cause the UE to control performance of a listen-before-talk (LBT) operation at the aligned starting positions prior to transmission of the PUSCH transmissions.

5. The one or more NTCRSM of claim 1, wherein execution of the instructions is to cause the UE to:
identify an earliest starting position among the indicated starting positions;
control performance of an LBT operation at the earliest starting position; and control non-performance of an LBT operation at other starting positions among the indicated starting positions.

6. The one or more NTCRSM of claim 5, wherein execution of the instructions is to cause the UE to control performance of an LBT operation at each indicated starting position, in turn, when the LBT operated performed at the earliest starting position is determined to have failed.

7. The one or more NTCRSM of claim 1, wherein the UE is not capable of simultaneous reception and transmission.

8. The one or more NTCRSM of claim 7, wherein the subframe is part of a Frame Structure type 2 (FS2) radio frame or part of a Frame Structure type 3 (FS3) radio frame.

9. The one or more NTCRSM of claim 1, wherein the DCI is a DCI format 0A message, a DCI format 0B message, a DCI format 4A message, or a DCI format 4B message.

10. The one or more NTCRSM of claim 9, wherein the DCI comprises individual two bit PUSCH starting position fields for each indicated starting position, wherein the individual two bit PUSCH starting position fields are to include:
a value of "00" to indicate a starting position of symbol 0;
a value of "01" to indicate a starting position of 25 microseconds (µs) in symbol 0;
a value of "10" to indicate a starting position of 25 µs plus a timing advance (TA) in symbol 0; or
a value of "11" to indicate a starting position of symbol 1.

11. A system on chip (SoC) to be implemented in a user equipment (UE) the SoC comprising:
baseband circuitry and memory circuitry, the baseband circuitry to:
control receipt of Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe;
control storage of each of the at least two uplink grants in the memory circuitry; and
align the different starting positions to provide for the UE to transmit uplink transmissions according to the at least two uplink grants while the UE is in a transmission mode.

12. The SoC of claim 11, wherein, to align the different starting positions, the baseband circuitry is to:
align the different starting positions to an earliest starting position among the indicated starting positions.

13. The SoC of claim 11, wherein, to align the different starting positions, the baseband circuitry is to:
align the different starting positions to a latest starting position among the indicated starting positions.

14. The SoC of claim 11, wherein the baseband circuitry is to:
perform a listen-before-talk, "LBT", operation at the aligned starting positions prior to transmission of the PUSCH transmissions.

15. The SoC of claim 11, wherein, to align the different starting positions, the baseband circuitry is to:
identify an earliest starting position among the indicated starting positions;
control performance of an LBT operation at the earliest starting position; and
not perform an LBT operation at other starting positions among the indicated starting positions.

16. The SoC of claim 15, wherein the baseband circuitry is to:
control performance of LBT operation at each indicated starting position, in turn, when the LBT performed at the earliest starting position is determined to have failed.

17. The SoC of claim 11, wherein the UE is not capable of simultaneous reception and transmission, and wherein the subframe is part of a Frame Structure type 2 (FS2) radio frame or part of a Frame Structure type 3 (FS3) radio frame.

18. The SoC of claim 11, wherein the DCI is a DCI format 0A message, a DCI format 0B message, a DCI format 4A message, or a DCI format 4B message, and wherein the DCI comprises individual two bit PUSCH starting position fields for each indicated starting position, wherein the individual two bit PUSCH starting position fields are to include:
a value of "00" to indicate a starting position of symbol 0;
a value of "01" to indicate a starting position of 25 microseconds (µs) in symbol 0;
a value of "10" to indicate a starting position of 25 µs plus a timing advance (TA) in symbol 0; or
a value of "11" to indicate a starting position of symbol 1.

19. An apparatus to be employed as a user equipment (UE), the apparatus comprising:
communication circuitry to receive Downlink Control Information (DCI) wherein the DCI is to indicate at least two uplink grants for one or more licensed assisted access (LAA) secondary cells (SCells) wherein each of the at least two uplink grants indicate different starting positions for Physical Uplink Shared Channel (PUSCH) transmissions within a same subframe; and
processor circuitry communicatively coupled with the communication circuitry, the processor circuitry is to:
perform a decode attempt on a set of Physical Downlink Control Channel (PDCCH) candidates or a set of enhanced PDCCH (EPDCCH) candidates to obtain the DCI, and
align the different starting positions to provide for the UE to transmit uplink transmissions according to the at least two uplink grants while the UE is in a transmission mode.

20. The apparatus of claim 19, wherein the processor circuitry is to align the different starting positions to an earliest starting position among the indicated starting positions or align the different starting positions to a latest starting position among the indicated starting positions.

21. The apparatus of claim 19, wherein the communication circuitry is to perform a listen-before-talk (LBT) operation at the aligned starting positions prior to transmission of the PUSCH transmissions.

22. The apparatus of claim 19, wherein:
the processor circuitry is to identify an earliest starting position among the indicated starting positions, and
the communication circuitry is to perform an LBT operation at the earliest starting position; and for not performing an LBT operation at other starting positions among the indicated starting positions.

23. The apparatus of claim 22, wherein the processor circuitry is to control the communication circuitry to perform an LBT operation at each indicated starting position, in turn, when the LBT operated performed at the earliest starting position is determined to have failed.

24. The apparatus of claim 19, wherein the UE is not capable of simultaneous reception and transmission, and wherein the subframe is part of a Frame Structure type 2 (FS2) radio frame or part of a Frame Structure type 3 (FS3) radio frame.

25. The apparatus of claim 19, wherein the DCI is a DCI format 0A message, a DCI format 0B message, a DCI format 4A message, or a DCI format 4B message, and wherein the DCI comprises individual two bit PUSCH starting position fields for each indicated starting position, wherein the individual two bit PUSCH starting position fields are to include:
- a value of "00" to indicate a starting position of symbol 0;
- a value of "01" to indicate a starting position of 25 microseconds (μs) in symbol 0;
- a value of "10" to indicate a starting position of 25 μs plus a timing advance (TA) in symbol 0; and
- a value of "11" to indicate a starting position of symbol 1.

* * * * *